United States Patent
Park et al.

(10) Patent No.: US 12,389,413 B2
(45) Date of Patent: Aug. 12, 2025

(54) PROCESSING TIME DETERMINATION METHOD AND DEVICE OF TERMINAL IN WIRELESS VEHICLE COMMUNICATION SYSTEM

(71) Applicant: Samsung Electronics Co., Ltd., Suwon-si (KR)

(72) Inventors: Sungjin Park, Suwon-si (KR); Hyunseok Ryu, Suwon-si (KR); Jeongho Yeo, Suwon-si (KR); Jonghyun Bang, Suwon-si (KR); Cheolkyu Shin, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 239 days.

(21) Appl. No.: 17/756,188

(22) PCT Filed: Nov. 20, 2020

(86) PCT No.: PCT/KR2020/016490
§ 371 (c)(1),
(2) Date: May 18, 2022

(87) PCT Pub. No.: WO2021/101319
PCT Pub. Date: May 27, 2021

(65) Prior Publication Data
US 2022/0417976 A1    Dec. 29, 2022

(30) Foreign Application Priority Data
Nov. 20, 2019  (KR) ................. 10-2019-0149553

(51) Int. Cl.
*H04W 72/12*    (2023.01)
*H04W 72/14*    (2009.01)
*H04W 72/23*    (2023.01)

(52) U.S. Cl.
CPC .................. *H04W 72/23* (2023.01)

(58) Field of Classification Search
CPC ..... H04W 72/23; H04W 72/20; H04W 72/02; H04W 72/1263; H04W 72/51;
(Continued)

(56) References Cited

U.S. PATENT DOCUMENTS

2019/0254091 A1    8/2019  Kim et al.
2020/0260441 A1    8/2020  Tang
(Continued)

FOREIGN PATENT DOCUMENTS

KR   10-2021-0015334 A    2/2021
WO        2018004323 A1    1/2018
WO        2019/090478 A1   5/2019

OTHER PUBLICATIONS

Intel Corporation, "NR V2X Sidelink Communication Under gNB Control", 3GPP TSG RAN WG1 Meeting #98, Aug. 26-30, 2019, R1-1908634, 9 pages.
(Continued)

*Primary Examiner* — Candal Elpenord

(57) ABSTRACT

Disclosed are: a communication technique for merging, with IoT technology, a 5G communication system for supporting a data transmission rate higher than that of a 4G system; and a system therefor. The present disclosure can be applied to intelligent services (for example, smart homes, smart buildings, smart cities, smartcars or connected cars, healthcare, digital education, small businesses, security- and safety-related services, and the like) on the basis of 5G communication technology and IoT-related technology. A method of a terminal in a communication system, according to one embodiment of the disclosure, can comprise the steps of: receiving, from a base station, downlink control information (DCI) associated with sidelink transmission; confirming a preparation time associated with the sidelink transmission;
(Continued)

and performing the sidelink transmission on the basis of the DCI if a first timing associated with the sidelink transmission determined on the basis of the DCI is after the preparation time from a second timing associated with the DCI reception.

13 Claims, 31 Drawing Sheets

(58) Field of Classification Search
    CPC ........... H04W 72/535; H04W 74/0808; H04W 92/18; H04L 5/0007; H04L 5/0078; H04L 5/0053
    USPC .................................................. 370/329–330
    See application file for complete search history.

(56) References Cited

U.S. PATENT DOCUMENTS

| 2021/0337583 | A1* | 10/2021 | Li | ........................... | H04W 8/24 |
| 2022/0191896 | A1* | 6/2022 | Panteleev | ......... | H04W 72/1263 |
| 2023/0299888 | A1* | 9/2023 | Park | ..................... | H04L 1/1864 370/329 |

OTHER PUBLICATIONS

Supplementary European Search Report dated Oct. 25, 2022 in connection with European Patent Application No. 20 88 9726, 7 pages.
International Search Report and Written Opinion of the International Searching Authority dated Feb. 23, 2021, in connection with International Application No. PCT/KR2020/016490, 9 pages.
Huawei, et al., "NR Uu control for LTE sidelink," R1-1908046, 3GPP TSG RAN WG1 Meeting #98, Prague, Czech Republic, Aug. 26-30, 2019, 3 pages.
Huawei, et al., " NR Uu control for LTE sidelink," R1-1906593, 3GPP TSG RAN WG1 Meeting #97, Reno, USA, May 13-17, 2019, 7 pages.
Intel Corporation, "NR V2X sidelink communication in resource allocation mode-1," R1-1912204, 3GPP TSG RAN WG1 Meeting #99, Reno, Nevada, USA, Nov. 18-22, 2019, 6 pages.
ZTE, et al., "Mode 1 resource allocation schemes on sidelink," R1-1912552, 3GPP TSG RAN WG1 #99, Reno, Nevada, US, Nov. 18-22, 2019, 9 pages.
Office Action dated Apr. 8, 2025, in connection with Korean Application No. 10-2019-0149553, 9 pages.

* cited by examiner

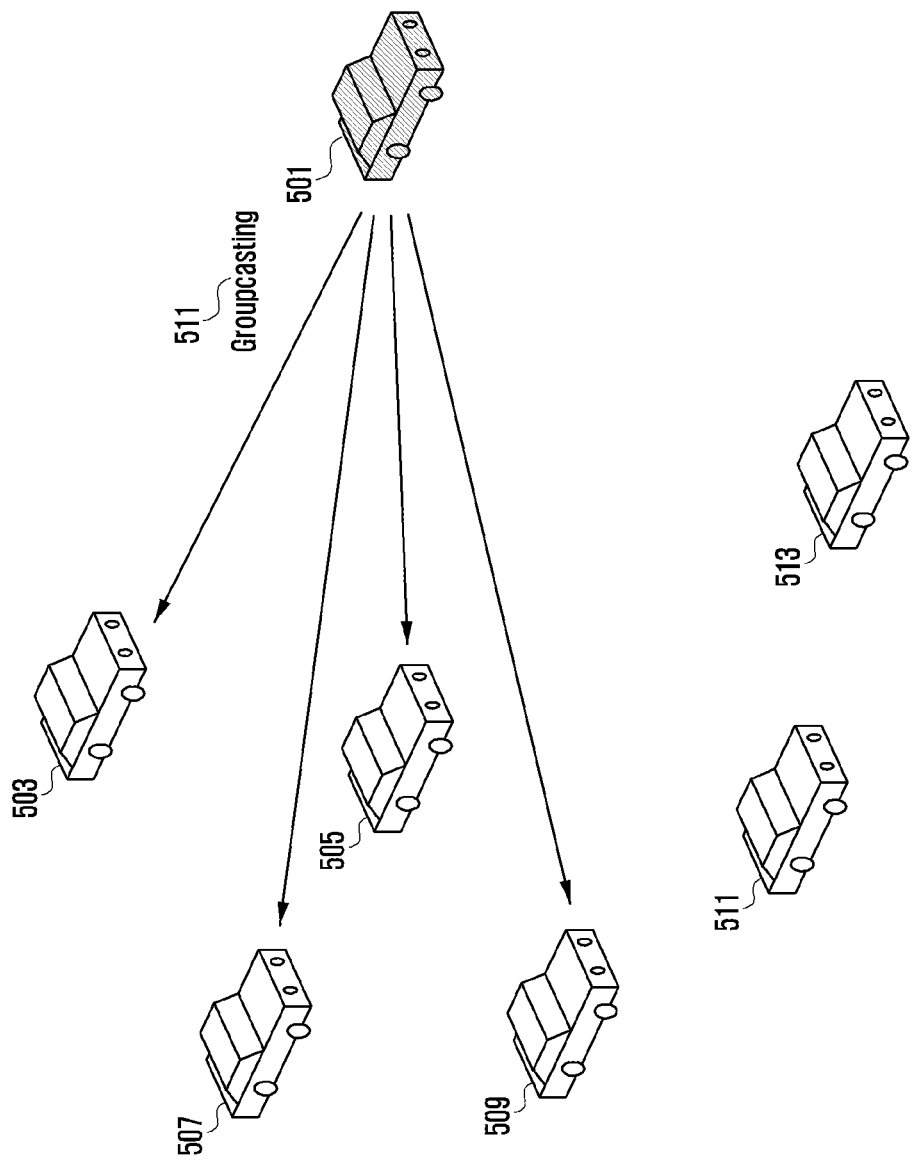

PROCESSING TIME DETERMINATION METHOD AND DEVICE OF TERMINAL IN WIRELESS VEHICLE COMMUNICATION SYSTEM

CROSS-REFERENCE TO RELATED APPLICATIONS

This application is a 371 National Stage of International Application No. PCT/KR2020/016490, filed Nov. 20, 2020, which claims priority to Korean Patent Application No. 10-2019-0149553, filed Nov. 20, 2019, the disclosures of which are herein incorporated by reference in their entirety.

BACKGROUND

1. Field

The disclosure relates to a method and apparatus for determining a processing time of a terminal in a wireless vehicle communication system. Specifically, the disclosure relates to a method and apparatus for determining a necessary terminal processing time when a terminal receives a sidelink resource configuration from a base station.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'. The 5G communication system established by the 3rd generation partnership project (3GPP) is called a new radio (NR) system. The 5G communication system is considered to be implemented in extremely high frequency (mmWave) bands, e.g., 60 or 70 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques have been discussed and adopted in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been required for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply the 5G communication system to the IoT network. For example, technologies such as a sensor network, machine type communication (MTC), and machine-to-machine (M2M) communication are being implemented on the basis of 5G communication technologies such as beamforming, MIMO, and an array antenna. The use of a cloud radio access network (cloud RAN) for big data processing technology is one example of convergence between the 5G technology and the IoT technology.

As various services can be provided thanks to the development of wireless communication systems as described above, there is a need for a technique to effectively provide such services. For example, a resource allocation technique is required in a wireless communication system.

SUMMARY

Disclosed embodiments are intended to provide a method and apparatus for determining sidelink resources and transmitting/receiving sidelink signals in a wireless communication system.

A method of a terminal in a communication system according to an embodiment of the disclosure for solving the above-described technical problem may include receiving downlink control information (DCI) related to sidelink transmission from a base station; identifying a preparation time related to the sidelink transmission; and performing sidelink transmission based on the DCI when a first timing related to sidelink transmission determined based on the DCI is after the preparation time from a second timing related to the DCI reception.

According to an embodiment, the preparation time related to the sidelink transmission may be identified based on a value determined depending on a subcarrier spacing of a sidelink channel related to the sidelink transmission or a downlink channel related to the DCI reception.

According to an embodiment, the value determined depending on the subcarrier spacing may be determined based on a larger or same value between a first subcarrier spacing of the sidelink channel and a second subcarrier spacing of the downlink channel.

According to an embodiment, the value determined depending on the subcarrier spacing may be 10 when the subcarrier spacing is 15 kHz, 12 in case of 30 kHz, 23 in case of 60 kHz, and 36 in case of 120 kHz.

According to an embodiment, the first timing may be a first symbol related to the sidelink transmission, and the second timing may be a last symbol related to the DCI reception.

According to an embodiment, when the first timing related to the sidelink transmission determined based on the DCI is before the preparation time from the second timing related to the DCI reception, the received DCI may be ignored.

According to an embodiment, the DCI may include information for scheduling a resource related to sidelink transmission or information for activating a configured grant (CG) sidelink resource.

A terminal in a communication system according to an embodiment of the disclosure may include a transceiver; and a controller configured to receive downlink control information (DCI) related to sidelink transmission from a base station, to identify a preparation time related to the sidelink transmission, and to perform sidelink transmission based on the DCI when a first timing related to sidelink transmission determined based on the DCI is after the preparation time from a second timing related to the DCI reception.

A method of a base station in a communication system according to an embodiment of the disclosure may include determining downlink control information (DCI) related to sidelink transmission of a terminal; and transmitting the DCI to the terminal, wherein the DCI may be determined so that a first timing related to the sidelink transmission of the terminal according to the DCI is after a preparation time related to the sidelink transmission from a second timing related to the DCI transmission.

A base station in a communication system according to an embodiment of the disclosure may include a transceiver; and a controller configured to determine downlink control information (DCI) related to sidelink transmission of a terminal, and to transmit the DCI to the terminal, wherein the DCI may be determined so that a first timing related to the sidelink transmission of the terminal according to the DCI is after a preparation time related to the sidelink transmission from a second timing related to the DCI transmission.

The disclosed embodiments provide a apparatus and method capable of effectively providing a service in a mobile communication system.

BRIEF DESCRIPTION OF THE DRAWINGS

FIG. 5 is a diagram illustrating groupcast communication that one UE transmits common data to a plurality of UEs through a sidelink according to an embodiment of the disclosure.

DETAILED DESCRIPTION

Figure 1:
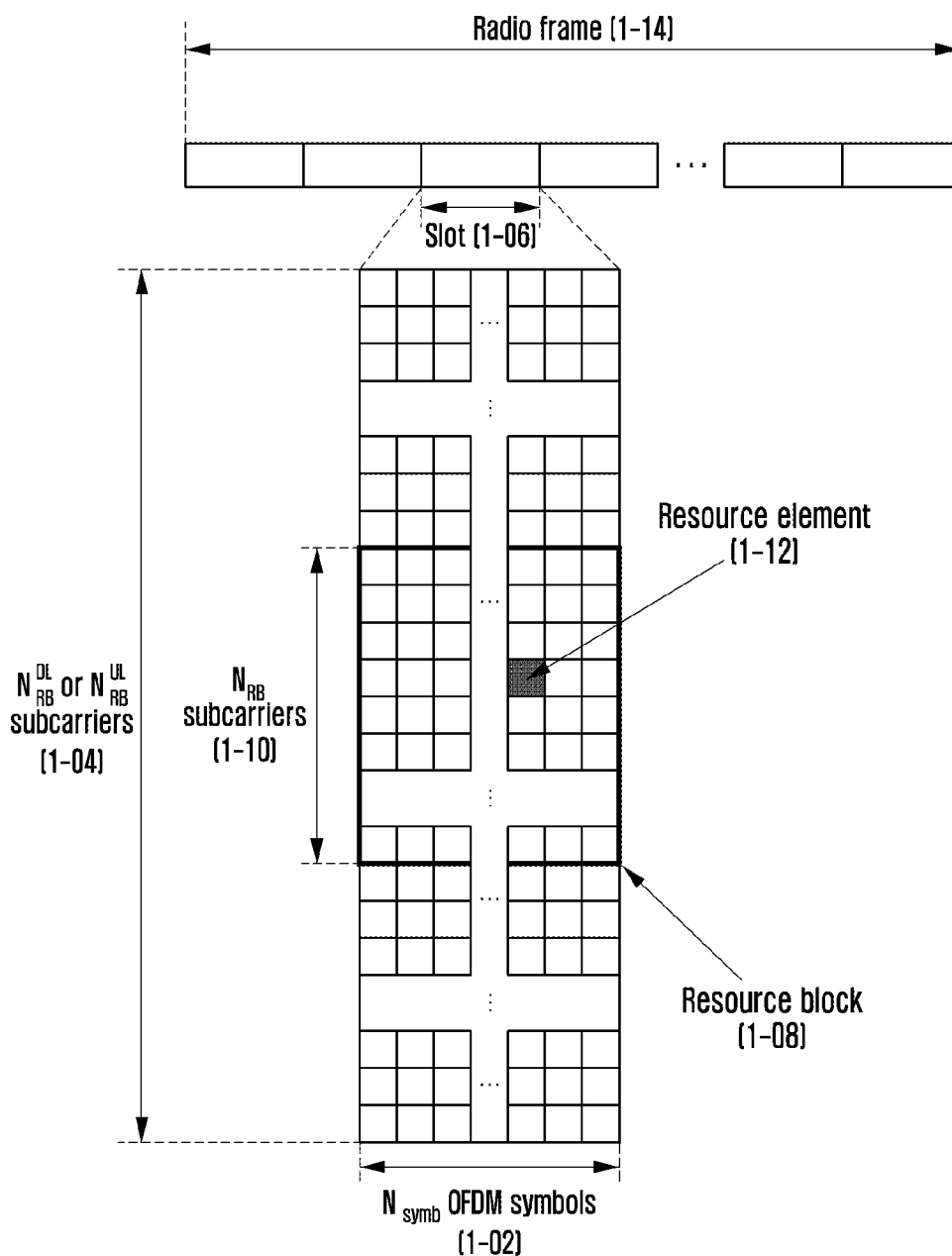
FIG. 1 is a diagram illustrating a basic structure of a time-frequency domain which is a radio resource domain in which data or a control channel is transmitted in an NR system according to an embodiment of the disclosure.

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'. The 5G communication system established by the 3rd generation partnership project (3GPP) is called a new radio (NR) system. The 5G communication system is considered to be implemented in extremely high frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques have been discussed and adopted in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been required for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply the 5G communication system to the IoT network. For example, technologies such as a sensor network, machine type communication (MTC), and machine-to-machine (M2M) communication are being implemented on the basis of 5G communication technologies such as beamforming, MIMO, and an array antenna. The use of a cloud radio access network (cloud RAN) for big data processing technology is one example of convergence between the 5G technology and the IoT technology.

Meanwhile, New Radio access technology (NR), which is a new 5G communication, is being designed to allow various services to be freely multiplexed in time and frequency resources, and thus waveform/numerology, reference signals, etc. may be dynamically or freely allocated according to needs of the corresponding service. In order to provide an optimal service to a UE in wireless communication, it is important to optimize data transmission through measurement of channel quality and interference, and it is essential to measure an accurate channel state. However, unlike 4G communication where channel and interference characteristics do not change significantly depending on frequency resources, 5G channel is subject to a great change in the channel and interference characteristics depending on the service, so it is necessary to support a subset of frequency resource group (FRG) dimension for measuring them separately. Meanwhile, in the NR system, the types of supported services may be divided into categories such as enhanced mobile broadband (eMBB), massive machine type communications (mMTC), and ultra-reliable and low-latency communications (URLLC). The eMBB is a service that aims for a high-speed transmission of high-capacity data, the mMTC is a service that aims for UE power minimization and connectivity of multiple UEs, and the URLLC is a service that aims for high reliability and low latency. Depending on the type of service applied to the UE, different requirements may be applied.

As such, a plurality of services may be provided to a user in the communication system, and a method and apparatus for providing respective services within the same time section in accordance with their characteristics may be required.

Hereinafter, embodiments of the disclosure will be described in detail with reference to the accompanying drawings.

In describing embodiments, descriptions of technical contents that are well known in the technical field to which the disclosure pertains and are not directly related to the disclosure will be omitted. This is to more clearly convey the subject matter of the disclosure without obscuring it by omitting unnecessary description.

For the same reason, some elements are exaggerated, omitted, or schematically illustrated in the accompanying drawings. In addition, the depicted size of each element does not fully reflect the actual size. In the drawings, the same or corresponding elements are assigned the same reference numerals.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. Throughout the specification, the same reference numerals refer to the same constitutional elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, a "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card. Also, in embodiments, the unit may include one or more processors.

Outgrowing what provides an initial voice-oriented service, a wireless communication system is evolving to a broadband wireless communication system that provides a high-speed and high-quality packet data service, like communication standards such as, for example, 3GPP high speed packet access (HSPA), long term evolution (LTE) (or evolved universal terrestrial radio access (E-UTRA)), LTE-advanced (LTE-A), high rate packet data (HRPD) of 3GPP2, ultra-mobile broadband (UMB), and 802.16e of IEEE. In addition, a 5G or new radio (NR) communication standard is being made as a 5G wireless communication system.

As a representative example of the broadband wireless communication system, an NR system employs an orthogonal frequency division multiplexing (OFDM) scheme in a downlink (DL) and an uplink (UL). Specifically, a cyclic-prefix OFDM (CP-OFDM) scheme is employed in the downlink, and a discrete Fourier transform spreading OFDM (DFT-S-OFDM) scheme is employed together with the CP-OFDM in the uplink. The uplink refers to a radio link in which a terminal (user equipment (UE) or mobile station (MS)) transmits data or control signals to a base station (BS) (or gNode B), and the downlink refers to a radio link in which the base station transmits data or control signals to the terminal. This multiple access scheme generally allocates and operates time-frequency resources for carrying data or control information to be not overlapped for each user (that is, orthogonality is established), so that each user's data or control information can be distinguished.

The NR system employs a hybrid automatic repeat request (HARQ) scheme for retransmitting corresponding data in a physical layer when a decoding failure occurs in the initial transmission. In the HARQ scheme, when failing to correctly decode data, a receiver sends information (negative acknowledgment: NACK) indicating a decoding failure to a transmitter so that the transmitter can retransmit the data in the physical layer. The receiver may improve data reception performance by combining data retransmitted by the transmitter with data that has previously failed to be decoded. In addition, when correctly decoding data, the receiver sends information (acknowledgement: ACK) indicating a decoding success to the transmitter so that the transmitter can transmit new data.

The disclosure relates to a method and apparatus for determining a sidelink resource and transmitting/receiving a sidelink signal in a wireless communication system. Specifically, the disclosure relates to a method and apparatus for slot mapping when a UE receives scheduling information from a base station to determine timing and resources for sidelink data transmission and transmits sidelink data.

According to an embodiment of the disclosure, provided are a method for determining a minimum processing time based on a timing at which base station scheduling information is transmitted in sidelink transmission and a method for determining a timing at which a sidelink control signal and data are actually transmitted. In addition, a rate matching method is provided when performing a method of mapping data to one or more slots in sidelink data transmission.

In a wireless communication system, particularly, a New Radio (NR) system, when data is transmitted from a transmitting end to a receiving end, the receiving end may transmit HARQ-ACK feedback information of the corresponding data to the transmitting end after receiving the data. For example, in downlink data transmission, a UE may transmit HARQ-ACK feedback information for data received from a base station to the base station based on configured resources.

In sidelink data transmission, a receiving UE may transmit HARQ-ACK feedback to a transmitting UE. This HARQ-ACK feedback may be used as information for the transmitting UE to determine retransmission. As a physical channel for the receiving UE to transmit the HARQ-ACK feedback, a physical sidelink feedback channel (PSFCH) may be used. Because all slots of the sidelink may not have resources for transmitting the PSFCH, the receiving UE needs to transmit HARQ-ACK feedback information for a plurality of data (PSSCH, physical sidelink shared channel) in one PSFCH. The disclosure provides a method and apparatus for transmitting HARQ-ACK feedback in communication between UEs, that is, sidelink communication. Therefore, according to the disclosure, the receiving UE may transmit HARQ-ACK feedback to the transmitting UE in sidelink communication.

FIG. 1 is a diagram illustrating a basic structure of a time-frequency domain which is a radio resource domain in which data or a control channel is transmitted in an NR system according to an embodiment of the disclosure.

Specifically, FIG. 1 shows the basic structure of the time-frequency domain which is a radio resource domain in which data or a control channel is transmitted in downlink or uplink in the NR system.

With reference to FIG. 1, the horizontal axis represents the time domain, and the vertical axis represents the frequency domain. The minimum transmission unit in the time domain is an OFDM symbol, and $N_{symb}$ OFDM symbols 1-02 constitute one slot 1-06. The length of a subframe is defined as 1.0 ms, and a radio frame 1-14 is defined as 10 ms. The minimum transmission unit in the frequency domain is a subcarrier, and the bandwidth of the entire system transmission band is composed of New subcarriers 1-04. A basic unit of a resource in the time-frequency domain is a resource element (RE) 1-12, which may be represented with an OFDM symbol index and a subcarrier index. A resource block (RB) 1-08 or physical resource block (PRB) is defined as consecutive $N_{symb}$ OFDM symbols 1-02 in the time domain and consecutive $N_{RB}$ subcarriers 1-10 in the frequency domain. Therefore, one RB 1-08 is composed of $N_{symb} \times N_{RB}$ number of REs 1-12. In general, the minimum transmission unit of data is an RB unit. In the NR system, $N_{symb}$ is 14, $N_{RB}$ is 12, and Now and $N_{RB}$ may be proportional to the bandwidth of the system transmission band. Also, a data rate may increase in proportion to the number of RBs scheduled for a UE.

In the NR system, in case of the FDD system that divides downlink and uplink by frequency, a downlink transmission bandwidth and an uplink transmission bandwidth may be different from each other. A channel bandwidth may represent an RF bandwidth corresponding to the system transmission bandwidth. Table 1 and Table 2 show a part of the corresponding relationship among system transmission bandwidth, subcarrier spacing, and channel bandwidth defined in the NR system in a frequency band lower than 6 GHz and a frequency band higher than 6 GHz, respectively. For example, the NR system having a channel bandwidth of 100 MHz with a subcarrier spacing of 30 kHz has a transmission bandwidth of 273 RBs. In the following, N/A may be a bandwidth-subcarrier combination not supported by the NR system.

TABLE 1

Composition of Frequency Range 1 (FR1)

| | | Channel bandwidth $BW_{Channel}$ [MHz] | | | | | |
|---|---|---|---|---|---|---|---|
| | Subcarrier spacing | 5 MHz | 10 MHz | 20 MHz | 50 MHz | 80 MHz | 100 MHz |
| Transmission bandwidth configuration $N_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 2

Composition of Frequency Range 2 (FR2)

| | | | | | |
|---|---|---|---|---|---|
| Channel bandwidth $BW_{Channel}$ [MHz] | Subcarrier spacing | 50 MHz | 100 MHz | 200 MHz | 400 MHz |
| Transmission bandwidth configuration $N_{RB}$ | 60 kHz | 66 | 132 | 264 | N/A |
| | 120 kHz | 32 | 66 | 132 | 264 |

In the NR system, the frequency range may be divided into FR1 and FR2 and defined as follows.

| Frequency range designation | Corresponding frequency range |
|---|---|
| FR1 | 450 MHz-7125 MHz |
| FR2 | 24250 MHz-52600 MHz |

The ranges of FR1 and FR2 may be changed and applied differently. For example, the frequency range of FR1 may be changed and applied from 450 MHz to 6000 MHz.

In the NR system, scheduling information for downlink data or uplink data is delivered from a base station to a UE through downlink control information (DCI). The DCI may be defined according to various formats, and based on each format, the DCI may indicate whether it is scheduling information (UL grant) for uplink data or scheduling information (DL grant) for downlink data, whether it is a compact DCI with a small size of control information, whether spatial multiplexing using multiple antennas is applied, whether it is DCI for power control, and the like. For example, DCI format 1-1, which is scheduling control information (DL grant) for downlink data, may include at least one of the following types of control information.

Carrier indicator: This indicates a frequency carrier where transmission is performed.

DCI format indicator: This is an indicator for distinguishing whether the corresponding DCI is for downlink or uplink.

Bandwidth part (BWP) indicator: This indicates a BWP where transmission is performed.

Frequency domain resource allocation: This indicates an RB in the frequency domain allocated for data transmission. A resource to be expressed is determined according to the system bandwidth and the resource allocation scheme.

Time domain resource allocation: This indicates an OFDM symbol and a slot to be used for transmission of a data-related channel.

VRB-to-PRB mapping: This indicates a mapping scheme between a virtual RB (VRB) index and a physical RB (PRB) index.

Modulation and coding scheme (MCS): This indicates a modulation scheme used for data transmission and the size of a transport block which is data to be transmitted.

HARQ process number: This indicates the process number of HARQ.

New data indicator: This indicates whether HARQ initial transmission or retransmission.

Redundancy version: This indicates a redundancy version of HARQ.

Transmit power control (TPC) command for physical uplink control channel (PUCCH): This indicates a transmit power control command for PUCCH which is an uplink control channel.

In case of data transmission via PDSCH or PUSCH, time domain resource assignment may be determined by information on a slot for PDSCH/PUSCH transmission, a start symbol position S in that slot, and the number of symbols L to which PDSCH/PUSCH is mapped. Here, S may be a relative position from the start of the slot, L may be the number of consecutive symbols, and S and L may be determined from a start and length indicator value (SLIV) defined as follows.

if (L−1)≤7 then $$SLIV=14 \cdot (L-1)+S$$

else $$SLIV=14 \cdot (14-L+1)+(14-1-S)$$

where 0<1≤14−S

In the NR system, through RRC configuration, the UE may be configured with information that includes, in one row, information about a SLIV value, a PDSCH/PUSCH mapping type, and a slot for PDSCH/PUSCH transmission (for example, such information may be configured in the form of a table). Then, in the time domain resource allocation of the DCI, an index value in the configured table is indicated so that the base station can transmit to the UE the information about a SLIV value, a PDSCH/PUSCH mapping type, and a slot for PDSCH/PUSCH transmission.

In the NR system, the PDSCH mapping type may be defined as type A and type B. According to the PDSCH mapping type A, the first symbol among DMRS symbols may be located in the second or third OFDM symbol in the slot. According to the PDSCH mapping type B, the first symbol among DMRS symbols may be located in the first OFDM symbol in the time domain resource allocated for PUSCH transmission.

The DCI may be transmitted on a physical downlink control channel (PDCCH) after a channel coding and modulation process. In the disclosure, transmission of control information through PDCCH or PUCCH may be expressed that PDCCH or PUCCH is transmitted. Similarly, in the disclosure, transmission of data through PUSCH or PDSCH may be expressed that PUSCH or PDSCH is transmitted.

In general, the DCI is scrambled with a specific radio network temporary identifier (RNTI) (or UE identifier) independently for each UE, adds a cyclic redundancy check (CRC), is channel-coded, is configured as each independent PDCCH, and is transmitted. The PDCCH is mapped and transmitted in a control resource set (CORESET) configured for the UE.

Downlink data may be transmitted on a physical downlink shared channel (PDSCH), which is a physical channel for downlink data transmission. The PDSCH may be transmitted after a control channel transmission interval, and scheduling information such as a specific mapping position in the frequency domain and a modulation scheme may be determined based on the DCI transmitted through the PDCCH.

Through the MCS among control information types constituting the DCI, the base station may notify the UE of a modulation scheme applied to the PDSCH to be transmitted and the size (transport block size, TBS) of data to be transmitted. According to an embodiment of the disclosure, the MCS may consist of 5 bits or more or fewer bits. The TBS may correspond to the size before the channel coding for error correction is applied to data (transport block, TB) to be transmitted by the base station.

In the disclosure, the transport block (TB) may contain a medium access control (MAC) header, a MAC control element (CE), one or more MAC service data units (SDUs), and padding bits. Alternatively, the TB may indicate a data unit or MAC protocol data unit (PDU) that is delivered from the MAC layer to the physical layer.

The modulation schemes supported in the NR system are quadrature phase shift keying (QPSK), 16 quadrature amplitude modulation (16QAM), 64QAM, and 256QAM, and each modulation order (Qm) corresponds to 2, 4, 6, or 8. That is, 2 bits per symbol may be transmitted in case of QPSK modulation, 4 bits per symbol in case of 16QAM modulation, 6 bits per symbol in case of 64QAM modulation, and 8 bits per symbol in case of 256QAM modulation.

Figure 2:
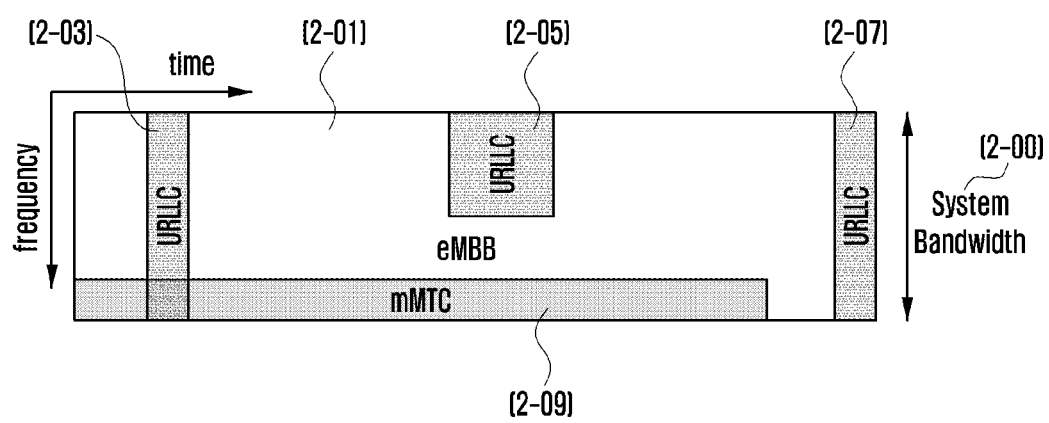
FIG. 2 is a diagram illustrating allocation of frequency and time resources for information transmission in an NR system according to an embodiment of the disclosure.
Figure 3:
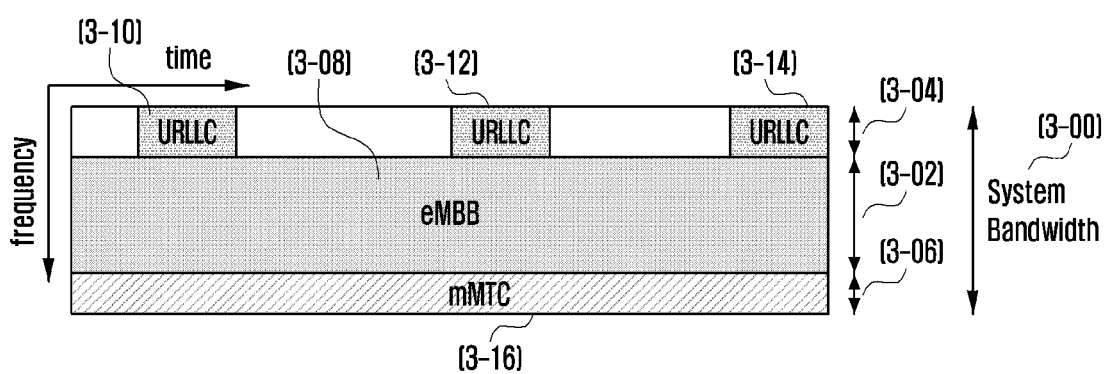
FIG. 3 is a diagram illustrating another example of allocation of frequency and time resources for information transmission in an NR system according to an embodiment of the disclosure.

FIGS. 2 and 3 are diagrams illustrating that data for eMBB, URLLC, and mMTC, which are services considered in the 5G or NR system, are allocated in frequency-time resources. With reference to FIGS. 2 and 3, a method for allocating frequency and time resources for information transmission in each system will be described.

FIG. 2 is a diagram illustrating allocation of frequency and time resources for information transmission in an NR system according to an embodiment of the disclosure.

With reference to FIG. 2, in the entire system frequency band 2-00, data for eMBB, URLLC, and mMTC may be allocated. In case that the transmission of URLLC data 2-03, 2-05, or 2-07 is needed while eMBB 2-01 and mMTC 2-09 are allocated and transmitted in a specific frequency band, the URLLC data 2-03, 2-05, or 2-07 may be transmitted by emptying a part to which the eMBB 2-01 and the mMTC 2-09 have been already allocated, or not transmitting them. Because a URLLC service among the above-mentioned services needs to reduce a latency time, the URLLC data 2-03, 2-05, or 2-07 may be allocated to and transmitted in a part of resources to which the eMBB 2-01 is allocated. Of course, in case that the URLLC is additionally allocated to and transmitted in the resource to which the eMBB is allocated, eMBB data may not be transmitted in the overlapped frequency-time resource, and therefore the transmission performance of the eMBB data may be lowered. That is, a failure in the eMBB data transmission may occur due to the URLLC allocation.

FIG. 3 is a diagram illustrating another example of allocation of frequency and time resources for information transmission in an NR system according to an embodiment of the disclosure.

With reference to FIG. 3, the entire system frequency band 3-00 may be divided into sub-bands 3-02, 3-04, and 3-06, which may be used for transmitting services and data. Information related to sub-band configuration may be predetermined and may be transmitted through higher level signaling of the base station. Alternatively, the division of sub-bands may be arbitrarily made by the base station or a network node, and thus services may be provided to the UE without separate transmission of sub-band configuration information. In FIG. 3, the sub-band 3-02 may be used for transmission of eMBB data 3-08, the sub-band 3-04 may be used for transmission of URLLC data 3-10, 3-12, or 3-14, and the sub-band 3-06 may be used for transmission of mMTC data 3-16.

A length of a transmission time interval (TTI) used for URLLC transmission may be shorter than a TTI length used for eMBB or mMTC transmission. In addition, a response of information related to URLLC may be transmitted faster than eMBB or mMTC, and thus information may be transmitted and received with low latency. Structures of physical layer channels used for respective types to transmit the above-described three services or data may be different. For example, at least one of a length of a TTI, an allocation unit of a frequency resource, a structure of a control channel, and a data mapping method may be different.

Although three types of services and three types of data have been described in FIGS. 2 and 3, more types of services and corresponding data may exist, and even in this case, the contents of the disclosure may also be applied.

In the disclosure, the terms physical channel and signal in the NR system may be used. However, the contents of the disclosure may be applied to any wireless communication system other than the NR system.

Hereinafter, a sidelink (SL) refers to a signal transmission/reception path between UEs and may be used interchangeably with a PC5 interface. Hereinafter, a base station, which is a subject that allocates resources of the terminal, may be a base station supporting both V2X communication and general cellular communication, or a base station supporting only V2X communication. That is, the base station may refer to an NR base station (gNB), an LTE base station (eNB), or a road site unit (RSU) (or fixed station). A terminal may include, as well as a use equipment (UE) or a mobile station, a vehicle supporting vehicle-to-vehicle (V2V) communication, a vehicle or pedestrian's handset (e.g., a smartphone) supporting vehicle-to-pedestrian (V2P) communication, a vehicle supporting vehicle-to-network (V2N) communication, a vehicle supporting vehicle-to-infrastructure (V2I) communication, an RSU equipped with a terminal function, an RSU equipped with a base station function, an RSU equipped with a part of base station function and a part of terminal function, and the like. In the disclosure, downlink (DL) refer to a wireless transmission path of a signal transmitted from a base station to a terminal, and uplink (UL) refers to a wireless transmission path of a signal transmitted from a terminal to a base station. In addition, although an embodiment of the disclosure will be described hereinafter based on the NR system, it may also be applied to a wireless communication system having a similar technical background or channel type. In addition, embodiments of the disclosure may be applied to any other communication system through some modifications within a range that does not significantly depart from the scope of the disclosure as being apparent to a person skilled in the art.

In the disclosure, typical terms of a physical channel and a signal may be used interchangeably with data or a control signal. For example, although PDSCH is a physical channel through which data is transmitted, the PDSCH may mean transmitted data.

Hereinafter, in the disclosure, higher signaling refers to a signal transmission method from a base station to a UE using a downlink data channel of a physical layer or from a UE to a base station using an uplink data channel of a physical layer, and may also be referred to as RRC signaling or MAC control element (CE).

In the following embodiment, a method and apparatus for transmitting and receiving HARQ-ACK feedback for data transmission between a base station and a UE or between UEs are provided. This feedback may be transmitted from one UE to a plurality of UEs or may be transmitted from one UE to one UE. In addition, the feedback may be transmitted from a base station to a plurality of UEs. However, the disclosure is not limited to the above case, and the disclosure may be applied to various cases.

Figure 4A:
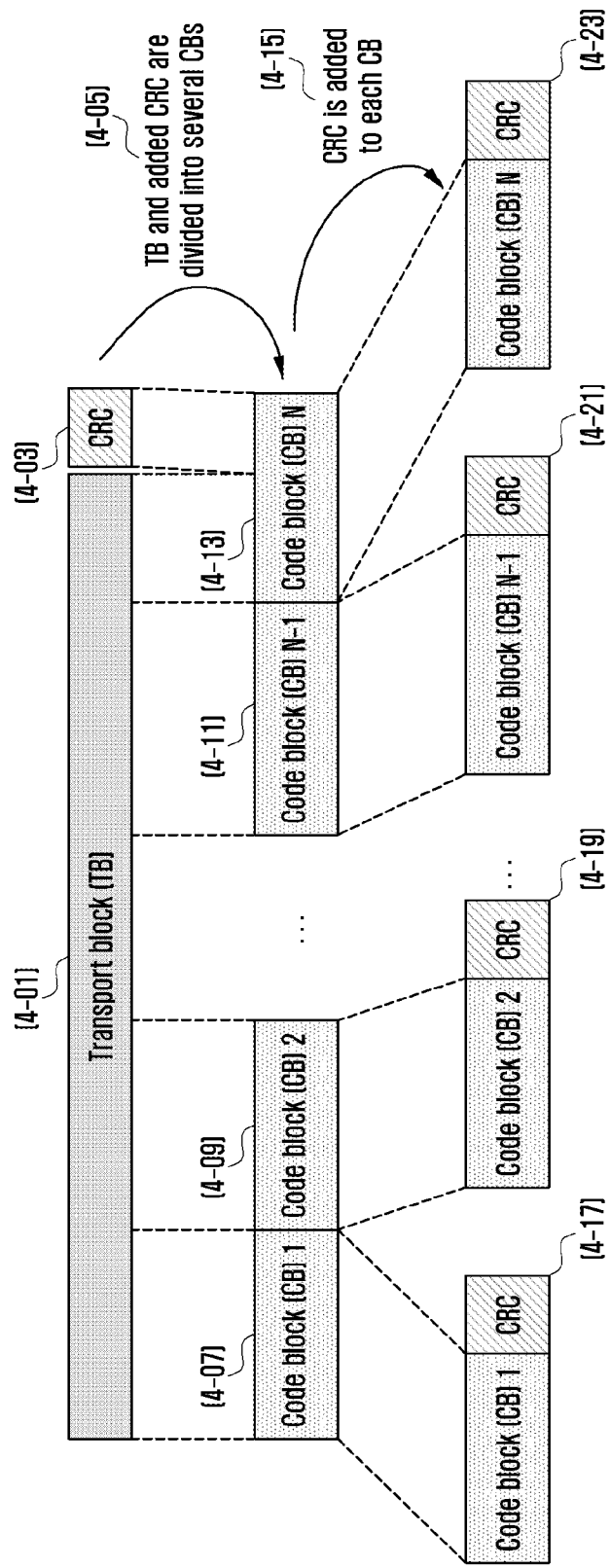
FIG. 4A is a diagram illustrating a process in which one transport block is divided into several code blocks and a CRC is added according to an embodiment of the disclosure.

FIG. 4A is a diagram illustrating a process in which one transport block is divided into several code blocks and a CRC is added according to an embodiment of the disclosure.

With reference to FIG. 4, a CRC 4-03 may be added to the last or front part of one transport block (TB) 4-01 to be transmitted in uplink or downlink. The CRC 4-03 may have 16 bits, 24 bits, a predetermined number of bits, or a variable number of bits depending on a channel condition, and may be used to determine whether or not channel coding is successful. The TB 4-01 and a block of the added CRC 4-03 may be divided 4-05 into several code blocks (CBs) 4-07, 4-09, 4-11, and 4-13. Here, the maximum size of the code block may be determined in advance, and in this case, the last code block 4-13 may have a smaller size than the other code blocks 4-07, 4-09, and 4-11. This is, however, only an example, and in another example, 0, a random value, or 1 may be inserted into the last code block 4-13 so that the last code block 4-13 and the other code blocks 4-07, 4-09, and 4-11 have the same length. In addition, CRCs 4-17, 4-19, 4-21, and 4-23 may be added 4-15 to the code blocks 4-07, 4-09, 4-11, and 4-13, respectively. The CRC may have 16 bits, 24 bits, or a predetermined number of bits, and may be used to determine whether channel coding succeeds.

The TB 4-01 and a cyclic generator polynomial may be used to generate the CRC 4-03, and the cyclic generator polynomial may be defined in various manners. For example, assuming that the cyclic generator polynomial for 24-bit CRC is $gCRC24A(D)=D24+D23+D18+D17+D14+D11+D10+D7+D6+D5+D4+D3+D+1$, and that L is 24, the CRC $p_0, p_1, p_2, p_3, \ldots, p_{L-1}$ for TB data $a_0, a_1, a_2, a_3, \ldots, a_{A-1}$ may be determined as a value that when dividing $a_0 D^{A+23} + a_1 D^{A+22} + \ldots + a_{A-1} D^{24} + p_0 D^{23} + p_1 D^{22} + \ldots + p_{22} D^1 + p_{23}$ by $gCRC24A(D)$, the remainder becomes zero.

Although a case that the CRC length L is 24 has been described above, the CRC length L may be determined to have various lengths such as 12, 16, 24, 32, 40, 48, 64, and the like.

After the CRC is added to the TB, it can be divided into N CBs 4-07, 4-09, 4-11, and 4-13. The CRCs 4-17, 4-19, 4-21, and 4-23 may be added 4-15 to the CBs 4-07, 4-09, 4-11, and 4-13, respectively. The CRC added to the CB may have a length different from that of the CRC added to the TB, or may use a different cyclic generator polynomial. However, the CRC 4-03 added to the TB and the CRCs 4-17, 4-19, 4-21, and 4-23 added to the code blocks may be omitted depending on the type of channel code to be applied to the code block. For example, when an LDPC code, not a turbo code, is applied to the code block, the CRCs 4-17, 4-19, 4-21, and 4-23 to be inserted for the respective code blocks may be omitted.

However, even when LDPC is applied, the CRCs 4-17, 4-19, 4-21, and 4-23 may be still added to the code blocks. Also, even when a polar code is used, such a CRC may be added or omitted.

As described in FIG. 4A, for the TB to be transmitted, the maximum length of one code block is determined depending on the type of channel coding applied, and the TB and the CRC added to the TB are divided into code blocks in accordance with the maximum length of the code block.

In the LTE system, a CRC for a CB is added to a divided CB. Data bits of the CB and the CRC are encoded with channel code, thereby coded bits are determined, and as promised in advance, the number of bits for rate matching is determined for the respective coded bits.

The size of the TB in the NR system may be determined through the following steps.

Step 1: The number of REs, $N'_{RE}$, allocated to PDSCH mapping in one PRB in the allocated resource is calculated. $N'_{RE}$ can be calculated as $N_{sc}^{RB} \cdot N_{symb}^{sh} - N_{DMRS}^{PRB} - N_{oh}^{PRB}$. Here, $N_{sc}^{RB}$ is 12, and $N_{symb}^{sh}$ may indicate the number of OFDM symbols allocated to PDSCH. $N_{DMRS}^{PRB}$ is the number of REs in one PRB occupied by DMRSs of the same CDM group. $N_{oh}^{PRB}$ is the number of REs occupied by an overhead in one PRB configured via higher signaling and may be configured as one of 0, 6, 12, and 18. Thereafter, the total number of REs $N_{RE}$ allocated to PDSCH can be calculated. $N_{RE}$ is calculated as min(156,$N'_{RE}$)·$n_{PRB}$ and $n_{PRB}$ indicates the number of PRBs allocated to the terminal.

Step 2: The number of temporary information bits $N_{info}$ can be calculated as NRE*R*Qm*v. Here, R is a code rate, Qm is a modulation order, and information on these values may be transmitted using an MCS bit field and a pre-arranged table in the control information. Also, i is the number of allocated layers. If $N_{info} \geq 3824$, TBS can be calculated through step 3 below. Otherwise, TBS can be calculated through step 4.

Step 3: $N'_{info}$ can be calculated via Equations of $$N'_{info} = \max\left(24, 2^n * \left\lfloor \frac{N_{info}}{2^n} \right\rfloor\right)$$

and n=max(3, $\lfloor \log_2(N_{info}) \rfloor$−6). TBS may be determined as a value closest to $N'_{info}$ among values not smaller than $N'_{info}$ in Table 3 below.

TABLE 3

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |

TABLE 3-continued

| Index | TBS |
|---|---|
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Step 4: $N'_{info}$ can be calculated through Equations of $$N'_{info} = \max\left(3840, 2^n \times \text{round}\left(\frac{N_{info} - 24}{2^n}\right)\right)$$

and n=$\lfloor \log_2(N_{info}-24) \rfloor$−5. TBS may be determined through the $N'_{info}$ value and the following Pseudo-code 1.

[Start of Pseudo-code 1]

- if R ≤ 1/4

$$TBS = 8 \cdot C \cdot \left\lceil \frac{N'_{info} + 24}{8 \cdot C} \right\rceil - 24, \text{ where } C = \left\lceil \frac{N'_{info} + 24}{3816} \right\rceil$$

else
 if $N'_{info}$ > 8424

$$TBS = 8 \cdot C \cdot \left\lceil \frac{N'_{info} + 24}{8 \cdot C} \right\rceil - 24, \text{ where } C = \left\lceil \frac{N'_{info} + 24}{8424} \right\rceil$$

else $$TBS = 8 \cdot \left\lceil \frac{N'_{info} + 24}{8} \right\rceil - 24$$

-continued

```
    end if
  end if
                [End of Pseudo-code 1]
```

In the NR system, when one CB is inputted to an LDPC encoder, parity bits may be added and outputted. In this case, the amount of parity bits may vary according to an LDCP base graph. A method of transmitting all parity bits generated by LDPC coding for a specific input may be referred to as full buffer rate matching (FBRM), and a method of limiting the number of transmittable parity bits may be referred to as limited buffer rate matching (LBRM). When a resource is allocated for data transmission, the LDPC encoder output is created as circular buffer, and the bits of the created buffer are repeatedly transmitted as much as the allocated resource. In this case, the length of the circular buffer is Ncb. If the number of all parity bits created by LDPC coding is N, Ncb becomes N in the FBRM method. In the LBRM method, Ncb becomes min(N,Nref), Nref is given as $$\left\lfloor \frac{TBS_{LBRM}}{C \cdot R_{LBRM}} \right\rfloor,$$

and RLBRM may be determined to be ⅔. TBSLBRM indicates the maximum number of layers supported by a UE in a corresponding cell in the above-described method for obtaining TBS. When the maximum modulation order is not configured for the UE in the cell, 64QAM is assumed, and the code rate assumes the maximum code rate of 948/1024. NRE may be assumed as 156·$n_{PRB}$, and nPRB may be assumed as $n_{PRB,LBRM}$·$N_{PRB,LBRM}$ may be given in Table 4 below.

TABLE 4

| Maximum number of PRBs across all configured BWPs of a carrier | $n_{PRB, LBRM}$ |
|---|---|
| Less than 33 | 32 |
| 33 to 66 | 66 |
| 67 to 107 | 107 |
| 108 to 135 | 135 |

TABLE 4-continued

| Maximum number of PRBs across all configured BWPs of a carrier | $n_{PRB, LBRM}$ |
|---|---|
| 136 to 162 | 162 |
| 163 to 217 | 217 |
| Larger than 217 | 273 |

The maximum data rate supported by the UE in the NR system may be determined through the following Equation 1.

$$\text{data rate (in } Mbps) = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot (1 - OH^{(j)}) \right) \quad \text{[Equation 1]}$$

In Equation 1, J is the number of carriers bound by carrier aggregation, $R_{max}$ is 948/1024, $v_{Layers}^{(j)}$ is the maximum number of layers, $Q_m^{(j)}$ is the maximum modulation order, $f^{(j)}$ is a scaling index, and μ denotes a subcarrier spacing. The UE may report $f^{(j)}$ as one of 1, 0.8, 0.75, and 0.4, and μ may be given in Table 5 below.

TABLE 5

| μ | Δf = $2^\mu$ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In addition, $T_s^\mu$ is an average OFDM symbol length, $T_s^\mu$ can be calculated as $$\frac{10^{-3}}{14 \cdot 2^\mu},$$

and $N_{PRB}^{BW(j),\mu}$ is the maximum number of RBs in BW(j). $OH^{(j)}$ is an overhead value and may be given as 0.14 in downlink and 0.18 in uplink of FR1 (6 GHz band or less) and given as 0.08 in downlink and 0.10 in uplink of FR2 (6 GHz band or more). Through Equation 1, the maximum data rate in the downlink in a cell having a 100 MHz frequency bandwidth at a 30 kHz subcarrier spacing can be calculated as Table 6 below.

TABLE 6

| $f^{(j)}$ | $v_{Layers}^{(j)}$ | $Q_m^{(j)}$ | Rmax | $N_{PRB}^{BW(j),\mu}$ | $T_s^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

On the other hand, an actual data rate that the UE can measure in actual data transmission may be a value obtained by dividing the amount of data by the data transmission time. This may be a value obtained by dividing TBS in 1-TB transmission and the sum of TBSs in 2-TB transmission by the TTI length. For example, the maximum actual data rate in the downlink in a cell having a 100 MHz frequency bandwidth at a 30 kHz subcarrier spacing as in Table 6 may be defined as in Table 7 below according to the number of allocated PDSCH symbols.

the same time, the transmission time may be different for respective terminals according to their locations. In 5G, NR, and LTE systems, this is called timing advance. A processing time of the UE according to the timing advance will be described later in FIG. 8.

Figure 4B:
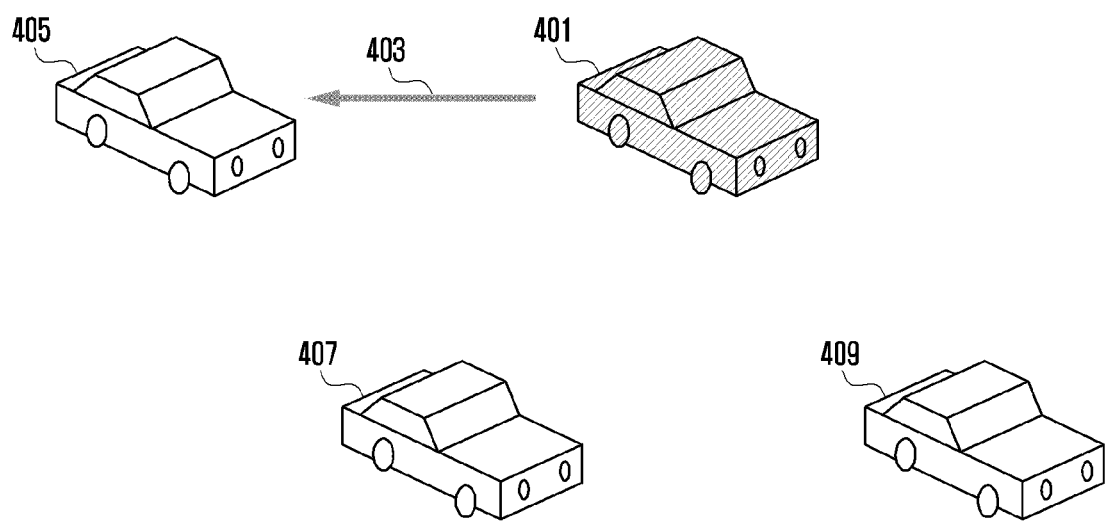
FIG. 4B is a diagram illustrating an example that one-to-one communication is performed between two UEs through a sidelink according to an embodiment of the disclosure.

FIG. 4B is a diagram illustrating an example that one-to-one communication is performed between two UEs through a sidelink according to an embodiment of the disclosure.

TABLE 7

| $N_{symb}^{sh}$ | $N_{DMRS}^{PRB}$ | $N'_{RE}$ | $N_{RE}$ | $N_{info}$ | n | $N'_{info}$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

The maximum data rate supported by the UE can be identified through Table 6, and the actual data rate according to the allocated TBS can be identified through Table 7. In this case, depending on scheduling information, there may be a case where the actual data rate is greater than the maximum data rate.

In a wireless communication system, particularly, a New Radio (NR) system, a data rate that the UE can support may be mutually agreed upon between the base station and the UE. This may be calculated using the maximum frequency band supported by the UE, the maximum modulation order, the maximum number of layers, and the like. However, the calculated data rate may be different from a value calculated from a transport block size (TBS) and a transmission time interval (TTI) length used for actual data transmission.

Therefore, the UE may be allocated a TBS greater than a value corresponding to a data rate supported by the terminal. To prevent this, there may be restrictions on the TBS that can be scheduled depending on the data rate supported by the UE.

Because the UE is generally far from the base station, a signal transmitted from the UE may be received by the base station after a propagation delay. The propagation delay is a value obtained by dividing a path through which radio waves are transmitted from the UE to the base station by the speed of light, and may generally be a value obtained by dividing a distance from the UE to the base station by the speed of light. For example, in case of the UE located 100 km away from the base station, a signal transmitted from the UE may be received by the base station after about 0.34 msec. Conversely, a signal transmitted from the base station may also be received by the UE after about 0.34 msec. As described above, the arrival time of a signal transmitted from the UE to the base station may vary depending on the distance between the UE and the base station. Thus, when multiple terminals located in different locations transmit signals simultaneously, arrival times at the base station may be different. To solve this phenomenon and allow signals transmitted from multiple UEs to arrive at the base station at Specifically, FIG. 4B is a diagram illustrating that one-to-one communication, i.e., unicast communication, is performed between two UEs 401 and 405 through a sidelink.

FIG. 4B shows an example that a signal is transmitted from a first UE 401 to a second UE 405, and the direction of signal transmission may be reversed. That is, a signal may be transmitted from the second UE 405 to the first UE 401. Except the first and second UEs 401 and 405, the other UEs 407 and 409 cannot receive signals transmitted/received through unicast between the first and second UEs 401 and 405. Transmission/reception of signals through unicast between the first and second UEs 401 and 405 may be mapped in a resource promised between the first and second UEs 401 and 405, or performed through processes of scrambling using mutually agreed values, control information mapping, data transmission using mutually configured values, mutually identifying unique ID values, and the like. The UE may be a moving UE such as a vehicle. For unicast communication, separate transmission of control information, physical control channel, and data may be performed.

Figure 4C:
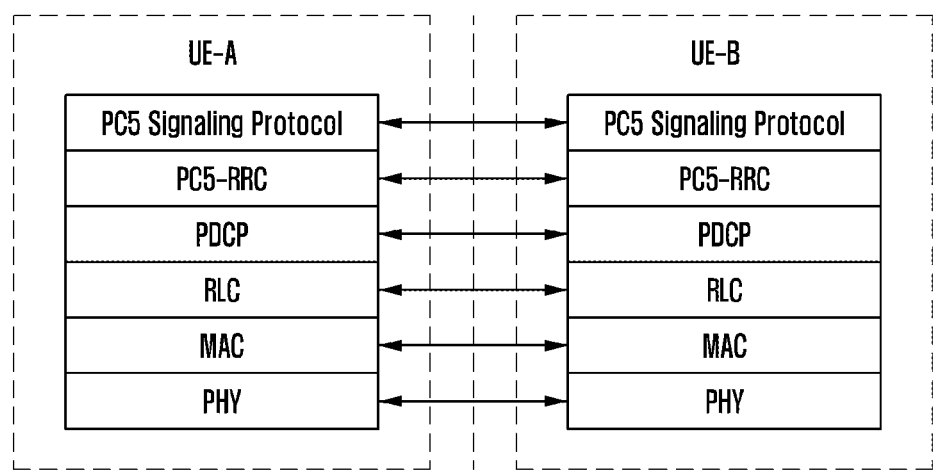
FIG. 4C is a diagram illustrating a protocol of a sidelink UE according to an embodiment of the disclosure.

FIG. 4C is a diagram illustrating a protocol of a sidelink UE according to an embodiment of the disclosure.

Although not shown in FIG. 4C, application layers of a UE-A and a UE-B may perform service discovery. In this case, the service discovery may include discovery about which sidelink communication method (unicast, groupcast, or broadcast) each UE will perform. Therefore, in FIG. 4C, it can be assumed that UE-A and UE-B recognize through a service discovery process performed in the application layer that they will perform unicast communication. In the above-described service discovery process, the sidelink UEs may acquire information on a source identifier (source ID) and a destination identifier (destination ID) for sidelink communication.

When the service discovery process is completed, the PC-5 signaling protocol layer shown in FIG. 4C may perform a direct link connection setup procedure between UEs. At this time, UE-A and UE-B may exchange security setup information for direct communication between UEs. When the direct link connection setup between UEs is completed, a PC-5 radio resource control (RRC) setup procedure between UEs may be performed in the PC-5 RRC layer of FIG. 4C. At this time, information on the capabilities of UE-A and UE-B may be exchanged, and access stratum (AS) layer parameter information for unicast communication may be exchanged.

When the PC-5 RRC setup procedure is completed, UE-A and UE-B can perform unicast communication.

In the disclosure, unicast communication has been described as an example, but the same technical idea may be extended and applied to groupcast communication. For example, when UE-A, UE-B, and UE-C (not shown) perform groupcast communication, UE-A and UE-B may perform the service discovery for unicast communication, the direct link setup between UEs, and the PC-5 RRC setup procedure as described above. Also, UE-A and UE-C may perform the service discovery for unicast communication, the direct link setup between UEs, and the PC-5 RRC setup procedure. Finally, UE-B and UE-C may perform the service discovery for unicast communication, the direct link setup between UEs, and the PC-5 RRC setup procedure. That is, instead of performing a separate PC-5 RRC setup procedure for groupcast communication, the PC-5 RRC setup procedure for unicast communication may be performed in each pair of transmitting and receiving UEs participating in groupcast communication.

FIG. 5 is a diagram illustrating groupcast communication that one UE transmits common data to a plurality of UEs through a sidelink according to an embodiment of the disclosure.

Specifically, with reference to FIG. 5, groupcast communication 511 that one UE 501 transmits common data to a plurality of UEs 503, 505, 507, and 509 through a sidelink may be performed.

In FIG. 5, a first UE 501 may transmit a signal to other UEs 503, 505, 507, and 509 in a group, and UEs 511 and 513 which are not included in the group may not receive signals transmitted for groupcast.

The UE transmitting a signal for groupcast may be any other UE in the group, and resource allocation for signal transmission may be provided by a base station, provided by a leader UE in the group, or selected by the signal-transmitting UE by itself. The UE may be a moving UE such as a vehicle. For groupcast, separate transmission of control information, physical control channel, and data may be performed.

Figure 6:
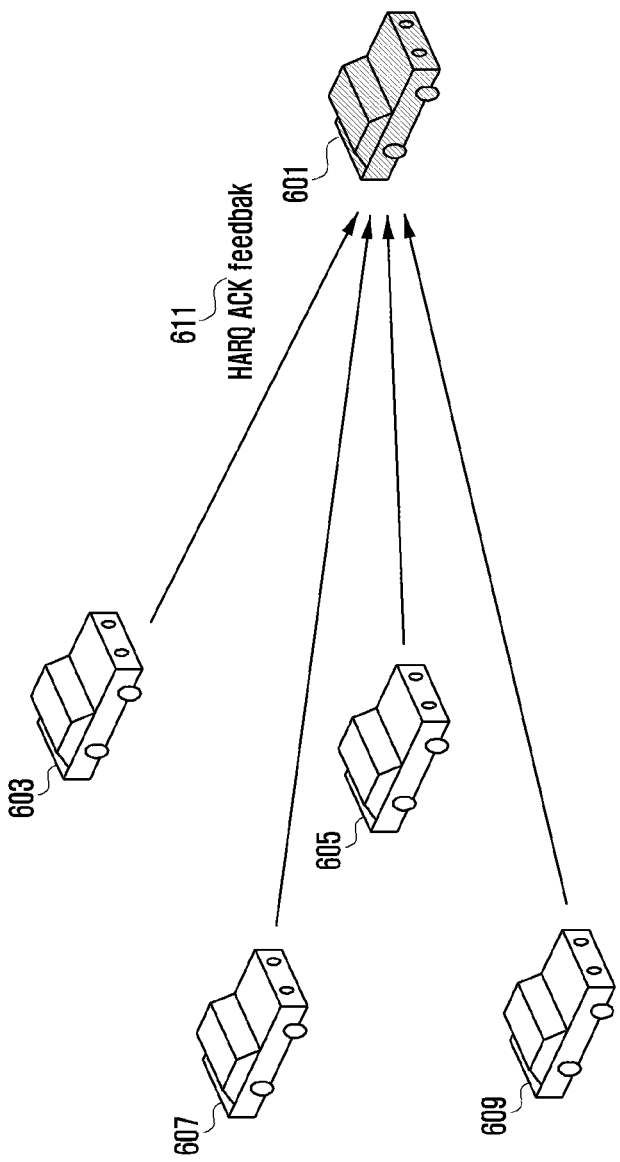
FIG. 6 is a diagram illustrating a process in which receiving UEs transmit information related to data reception to a transmitting UE according to an embodiment of the disclosure.

FIG. 6 is a diagram illustrating a process in which receiving UEs transmit information related to data reception to a transmitting UE according to an embodiment of the disclosure.

Specifically, with reference to FIG. 6, UEs 603, 605, 607, and 609 that have received common data through groupcast may transmit information related to success or failure of data reception to a data-transmitting UE 601. The information related to data reception success or failure may be HARQ-ACK feedback information 611. The UEs may be UEs having an LTE-based sidelink or NR-based sidelink function. If a UE having only an LTE-based sidelink function may not be able to transmit/receive an NR-based sidelink signal and physical channel. In the disclosure, the sidelink may be used interchangeably with PC5 or V2X or D2D. Although transmission and reception in groupcast according to an embodiment of the disclosure has been described with reference to FIGS. 5 and 6, this can also be applied to transmission and reception of a unicast signal between UEs.

Figure 7:
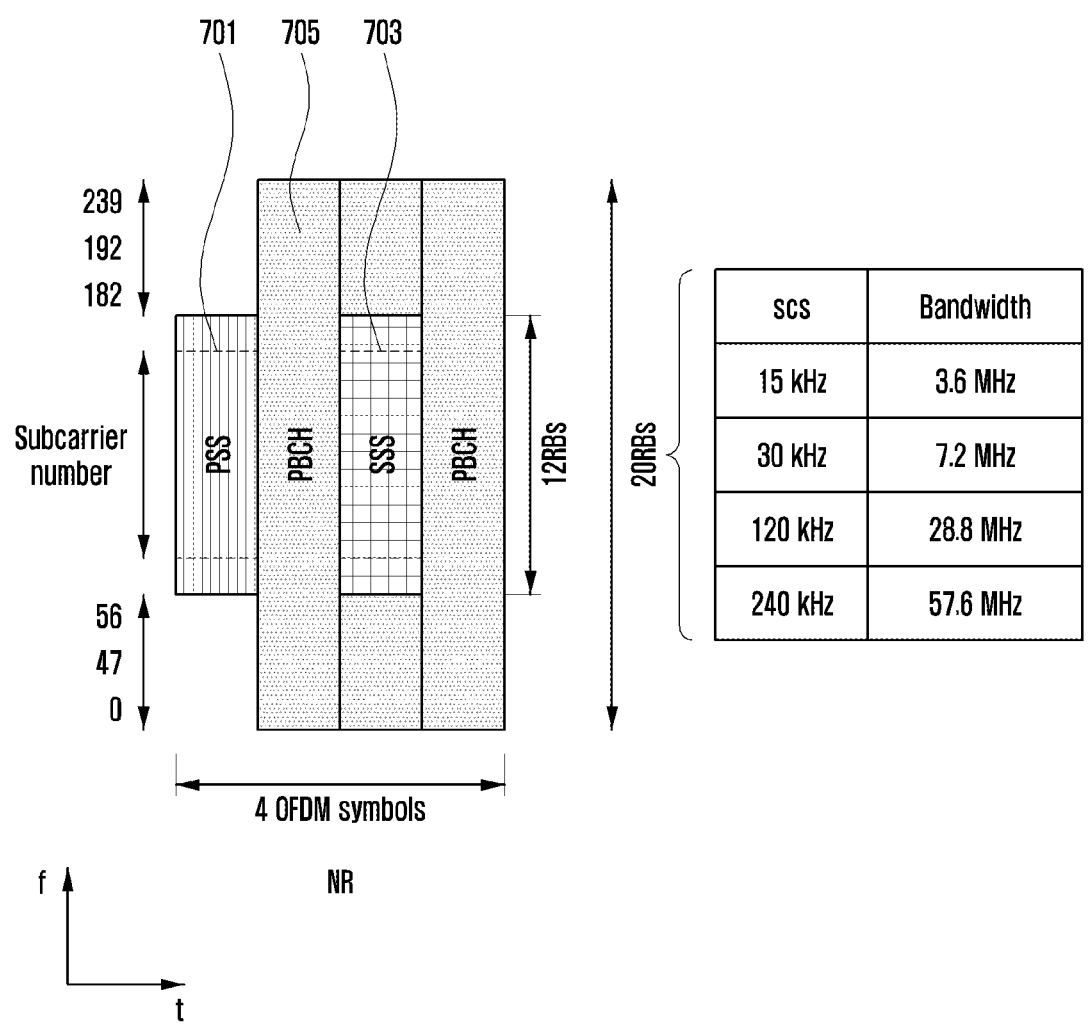
FIG. 7 is a diagram illustrating mapping of a synchronization signal and a physical broadcast channel of an NR system in frequency and time domains according to an embodiment of the disclosure.

FIG. 7 is a diagram illustrating mapping of a synchronization signal and a physical broadcast channel of an NR system in frequency and time domains according to an embodiment of the disclosure.

A primary synchronization signal (PSS) 701, a secondary synchronization signal (SSS) 703, and a PBCH 705 may be mapped over 4 OFDM symbols, the PSS and the SSS may be mapped to 12 RBs, and the PBCH may be mapped to 20 RBs. A table in FIG. 7 shows a frequency band of 20 RBs that varies according to subcarrier spacing (SCS). A resource region in which the PSS 701, the SSS 703, and the PBCH 705 are transmitted may be referred to as an SS/PBCH block. Also, the SS/PBCH block may be referred to as a synchronization signal block (SSB).

Figure 8:
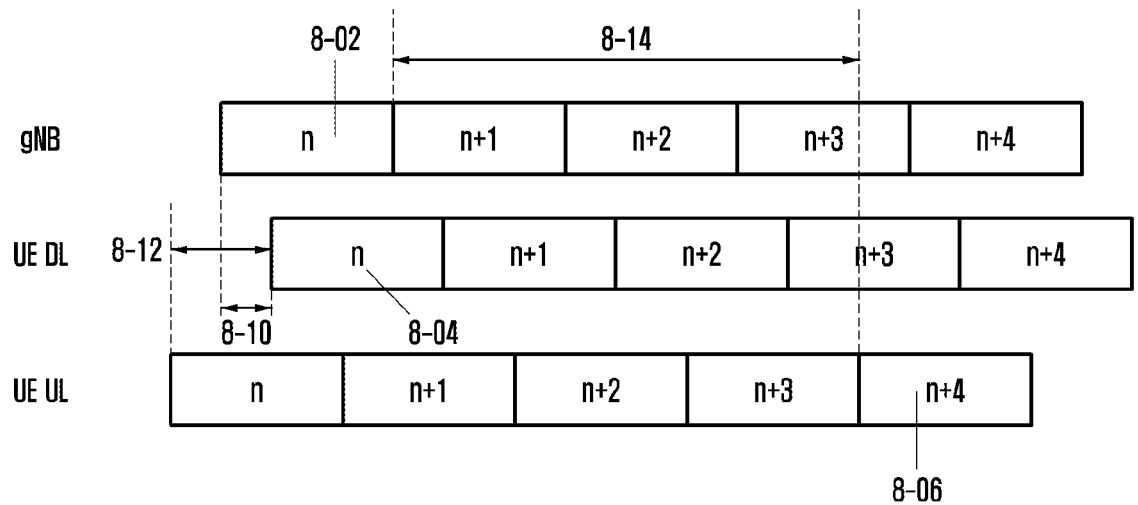
FIG. 8 is a diagram illustrating a processing time of a UE based on timing advance according to an embodiment of the disclosure.

FIG. 8 is a diagram illustrating a processing time of a UE based on timing advance according to an embodiment of the disclosure.

Specifically, FIG. 8 illustrates the processing time of the UE based on the timing advance when the UE receives a first signal and then transmits a second signal in the 5G or NR system according to an embodiment.

With reference to FIG. 8, when a base station (gNB) transmits an uplink scheduling grant or a downlink control signal and data to the UE in slot n 8-02, the UE may receive the uplink scheduling grant or the downlink control signal and data in slot n 8-04. In this case, the reception time of the UE may be later than the transmission time of the base station by a time of propagation delay (TP) 8-10. In this embodiment, in case of receiving the first signal in slot n 8-04, the UE may transmit the second signal for the received first signal in slot n+4 8-06. In case that the UE transmits a signal to the base station, in order to allow the signal to arrive at the base station at a specific time, the UE may transmit uplink data or HARQ ACK/NACK for downlink data at a timing 8-06 that is advanced by a timing advance (TA) 8-12 than the slot n+4 based on the received signal. Therefore, in an embodiment of the disclosure, a time during which the UE can prepare to transmit uplink data after receiving uplink scheduling grant or transmit HARQ ACK or NACK after receiving downlink data may be a time 8-14 excluding the TA from a time corresponding to three slots.

For determining the above-described timing, the base station may calculate the absolute value of the TA of the corresponding UE. The base station may calculate the absolute value of the TA by adding or subtracting the amount of change in the TA value transmitted through higher signaling to or from the TA value first delivered to the UE in the random access step at the initial access of the UE. In the disclosure, the absolute value of the TA may be a value obtained by subtracting the start time of the n-th TTI received by the UE from the start time of the n-th TTI transmitted by the UE.

Meanwhile, one of important criteria for performance of a cellular wireless communication system is packet data latency. To this end, in the LTE system, signal transmission and reception may be performed in units of subframes having a transmission time interval (TTI) of 1 ms. The LTE system that operates as described above may support a UE (short-TTI UE) having a TTI shorter than 1 ms. On the other hand, in the 5G or NR system, the TTI may be shorter than 1 ms. The short-TTI UE may be suitable for services, such as a Voice over LTE (VOLTE) service and a remote control, where latency is important. In addition, the short-TTI UE may realize a mission-critical Internet of Things (IoT) on a cellular basis.

In the 5G or NR system, when transmitting a PDSCH including downlink data, the base station may instruct a K1 value, which is a value corresponding to timing information for the UE to transmit HARQ-ACK information for the PDSCH, through DCI scheduling the PDSCH. If the HARQ-ACK information is not instructed to be transmitted before the symbol L1 by including timing advance, the UE may transmit the HARQ-ACK information to the base station. That is, the HARQ-ACK information may be transmitted from the UE to the base station at the same time as or later than the symbol L1 by including timing advance. If the HARQ-ACK information is instructed to be transmitted before the symbol L1 by including timing advance, the instructed HARQ-ACK information may not be valid HARQ-ACK information. The symbol L1 may be the first symbol in which a cyclic prefix (CP) starts after Tproc,1 from the last time point of the PDSCH. Tproc,1 can be calculated as in Equation 2 below.

$$T_{proc,1} = ((N_1 + d_{1,1} + d_{1,2})(2048+144) \cdot \kappa 2^{-\mu}) \cdot T_c \quad \text{[Equation 2]}$$

In the above Equation 2, N1, d1,1, d1,2, κμ, and TC may be defined as follows.

- d1,1 is 0 when HARQ-ACK information is transmitted over PUCCH (uplink control channel), and d1,1 is 1 when transmitted over PUSCH (uplink shared channel, data channel).
- In case that the UE is configured with a plurality of activated component carriers (CCs) or carriers, the maximum timing difference between carriers may be reflected in the second signal transmission.
- In case of PDSCH mapping type A, that is, when the first DMRS symbol position is the third or fourth symbol of the slot, if the position index i of the last symbol of the PDSCH is less than 7, d1,2 is defined as 7-i.
- In case of PDSCH mapping type B, that is, when the first DMRS symbol position is the first symbol of the PDSCH, if the length of the PDSCH is four symbols, d1,2 is 3, and if the length of the PDSCH is two symbols, d1,2 is 3+d, where d is the number of symbols in which the PDSCH and the PDCCH including the control signal for scheduling the corresponding PDSCH overlap.
- N1 is defined as in Table 8 below according to μ. Here, μ of 0, 1, 2, and 3 mean subcarrier spacing of 15 kHz, 30 kHz, 60 kHz, and 120 kHz, respectively.

TABLE 8

| | PDSCH decoding time $N_1$ [symbols] | |
|---|---|---|
| μ | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

Depending on UE capability, a different value may be used for the N1 value provided in Table 8 above.

$$T_c = 1/(\Delta f_{max} \cdot N_f), \Delta f_{max} = 480 \cdot 10^3 Hz, N_f = 4096, \kappa = T_s/T_c = 64, T_s = 1/(\Delta f_{ref} \cdot N_{f,ref}), \Delta f_{ref} = 15 \cdot 10^3 Hz, N_{f,ref} = 2048$$

Defined as above.

In addition, in the 5G or NR system, when transmitting control information including uplink scheduling grant, the base station may instruct a K2 value, which is a value corresponding to timing information for the UE to transmit uplink data or PUSCH.

If the PUSCH is not instructed to be transmitted before the symbol L2 by including timing advance, the UE may transmit the PUSCH to the base station. That is, the PUSCH may be transmitted from the UE to the base station at the same time as or later than the symbol L2 by including timing advance. If the PUSCH is instructed to be transmitted before the symbol L2 by including timing advance, the UE may ignore uplink scheduling grant control information from the base station. The symbol L2 may be the first symbol in which a cyclic prefix (CP) of the PUSCH symbol to be transmitted starts after Tproc,2 from the last time point of the PDCCH including the scheduling grant. Tproc,2 can be calculated as in Equation 3 below.

$$T_{proc,2} = (N_2 + d_{2,1})(2048+14) \cdot \kappa 2^{-\mu}) \cdot T_c \quad \text{[Equation 3]}$$

In the above Equation 3, N2, d2,1, κμ, and TC may be defined as follows.

- If the first symbol among PUSCH-allocated symbols includes only DMRS, d2,1 is 0, otherwise, d2,1 is 1.
- In case that the UE is configured with a plurality of activated component carriers (CCs) or carriers, the maximum timing difference between carriers may be reflected in the second signal transmission.
- N2 is defined as in Table 9 below according to μ. Here, μ of 0, 1, 2, and 3 mean subcarrier spacing of 15 kHz, 30 kHz, 60 kHz, and 120 kHz, respectively.

TABLE 9

| μ | PUSCH preparation time $N_2$ [symbols] |
|---|---|
| 0 | 10 |
| 1 | 12 |
| 2 | 23 |
| 3 | 36 |

Depending on UE capability, a different value may be used for the N2 value provided in Table 9 above.

$$T_c = 1/(\Delta f_{max} \cdot N_f), \Delta f_{max} = 480 \cdot 10^3 Hz, N_f = 4096, \kappa = T_s/T_c = 64, T_s = 1/(\Delta f_{ref} \cdot N_{f,ref}), -\Delta f_{ref} = 15 \cdot 10^3 Hz, N_{f,ref} = 2048$$

Defined as above.

On the other hand, the 5G or NR system may configure one or a plurality of bandwidth parts (hereinafter, referred to as BWPs) in one carrier so that a specific UE may perform transmission/reception within the configured BWP. This may be aimed at reducing power consumption of the UE. The base station may configure a plurality of BWPs, and the activated BWP may be changed through control information. A time that the UE can use when the BWP is changed may be defined as shown in Table 10 below.

TABLE 10

| Frequency Range | Scenario | Type 1 delay (us) | Type 2 delay (us) |
|---|---|---|---|
| 1 | 1 | 600 | 2000 |
| | 2 | 600 | 2000 |
| | 3 | 600 | 2000 |
| | 4 | 400 | 950 |
| 2 | 1 | 600 | 2000 |
| | 2 | 600 | 2000 |
| | 3 | 600 | 2000 |
| | 4 | 400 | 950 |

In Table 10, the frequency range 1 means a frequency band of 6 GHz or less or the FR1 band, and the frequency range 2 means a frequency band of 6 GHz or more or the FR2 band. In the above-described embodiment, the type 1 and the type 2 may be determined according to UE capability. In the above-described embodiment, the scenarios 1, 2, 3, and 4 are given as shown in Table 11 below.

TABLE 11

|  | Center frequency change | Center frequency constant |
| --- | --- | --- |
| Frequency bandwidth change | Scenario 3 | Scenario 2 |
| Frequency bandwidth constant | Scenario 1 | Scenario 4 when subcarrier spacing is changed |

Figure 9A:
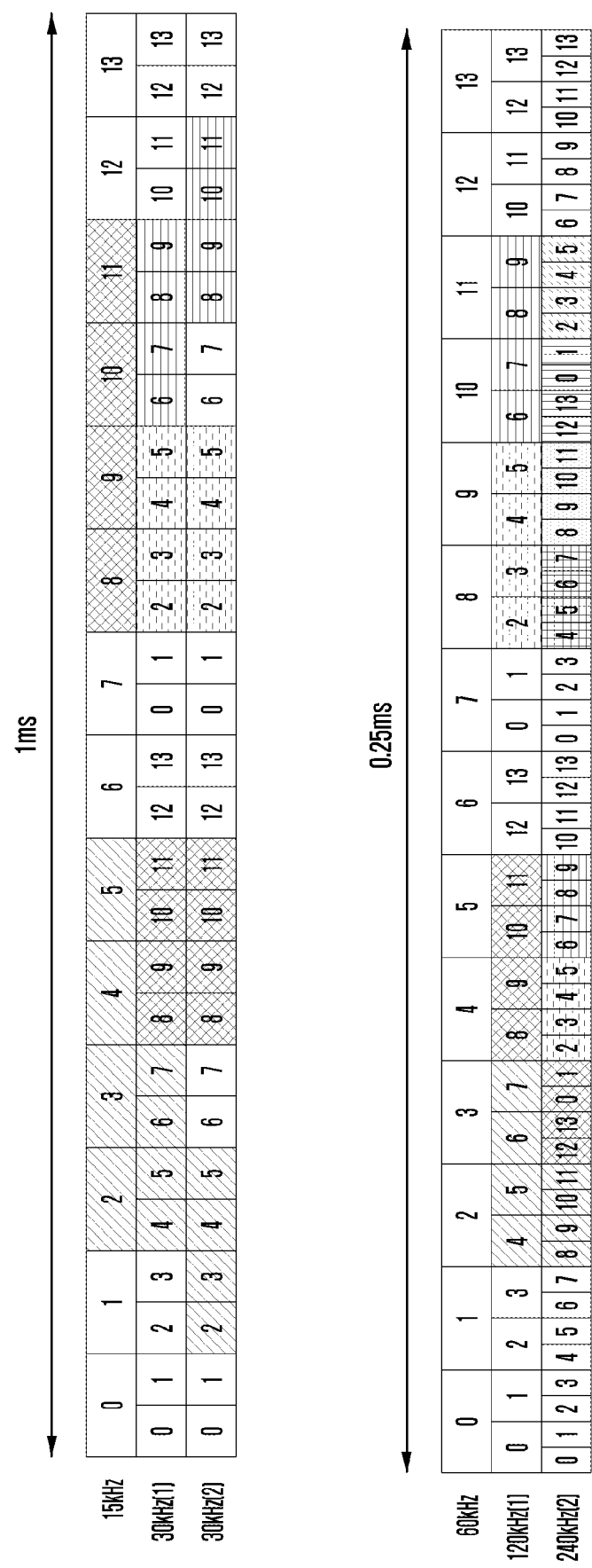
FIG. 9A is a diagram illustrating a symbol capable of transmitting an SS/PBCH block based on a subcarrier spacing according to an embodiment of the disclosure.

FIG. 9A is a diagram illustrating a symbol capable of transmitting an SS/PBCH block based on a subcarrier spacing according to an embodiment of the disclosure.

Specifically, FIG. 9A shows symbols to which one SS/PBCH block is mapped in a slot.

With reference to FIG. 9A, shown in an example of a typical LTE system using a subcarrier spacing of 15 kHz and an NR system using a subcarrier spacing of 30 kHz. The NR system is designed such that SS/PBCH blocks are transmitted at positions of avoiding cell-specific reference signals (CRSs) that are always transmitted in the LTE system. This may be to enable the LTE system and the NR system to coexist in one frequency band.

FIG. 9A is a diagram illustrating a symbol capable of transmitting an SS/PBCH block based on a subcarrier spacing according to an embodiment of the disclosure.

With reference to FIG. 9A, the subcarrier spacing may be configured as 15 kHz, 30 kHz, 120 kHz, 240 kHz, etc., and the position of a symbol where the SS/PBCH block (or SSB block) can be located may be determined based on each subcarrier spacing. Although FIG. 9 shows the positions of SSB transmittable symbols based on the subcarrier spacing in symbols within 1 ms, the SSB does not always have to be transmitted in a region shown in FIG. 9. Thus, the positions where the SSB blocks are transmitted may be configured in the UE through system information or dedicated signaling.

Figure 9B:
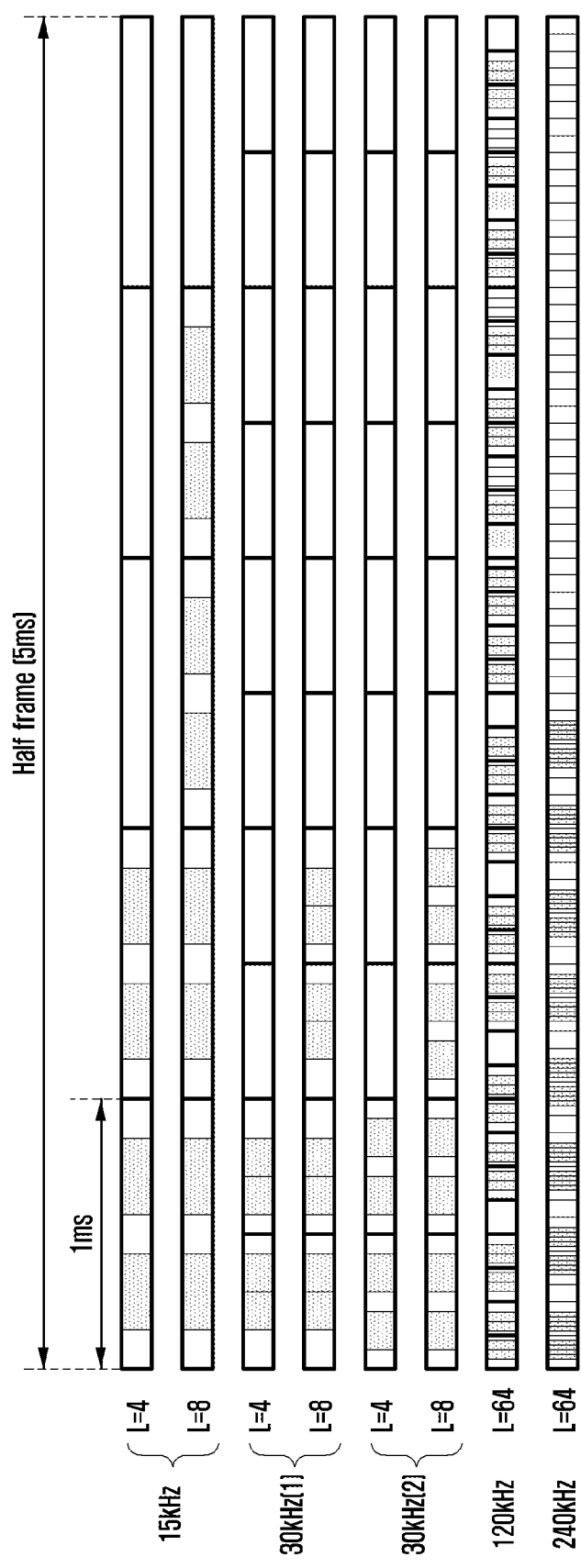
FIG. 9B is another diagram illustrating a symbol capable of transmitting an SS/PBCH block based on a subcarrier spacing according to an embodiment of the disclosure.

FIG. 9B is another diagram illustrating a symbol capable of transmitting an SS/PBCH block based on a subcarrier spacing according to an embodiment of the disclosure.

With reference to FIG. 9B, the subcarrier spacing may be configured as 15 kHz, 30 kHz, 120 kHz, 240 kHz, etc., and the position of a symbol where the SS/PBCH block (or SSB block) can be located may be determined based on each subcarrier spacing. FIG. 9B shows the positions of SSB block transmittable symbols based on the subcarrier spacing in symbols within 5 ms, and the positions where the SSB blocks are transmitted may be configured in the UE through system information or dedicated signaling. The SS/PBCH block does not always have to be transmitted in a region where the SS/PBCH block can be transmitted, and it may or may not be transmitted in response to the selection of the base station. That is, the position where the SSB block is transmitted may be configured in the UE through system information or dedicated signaling.

Figure 10:
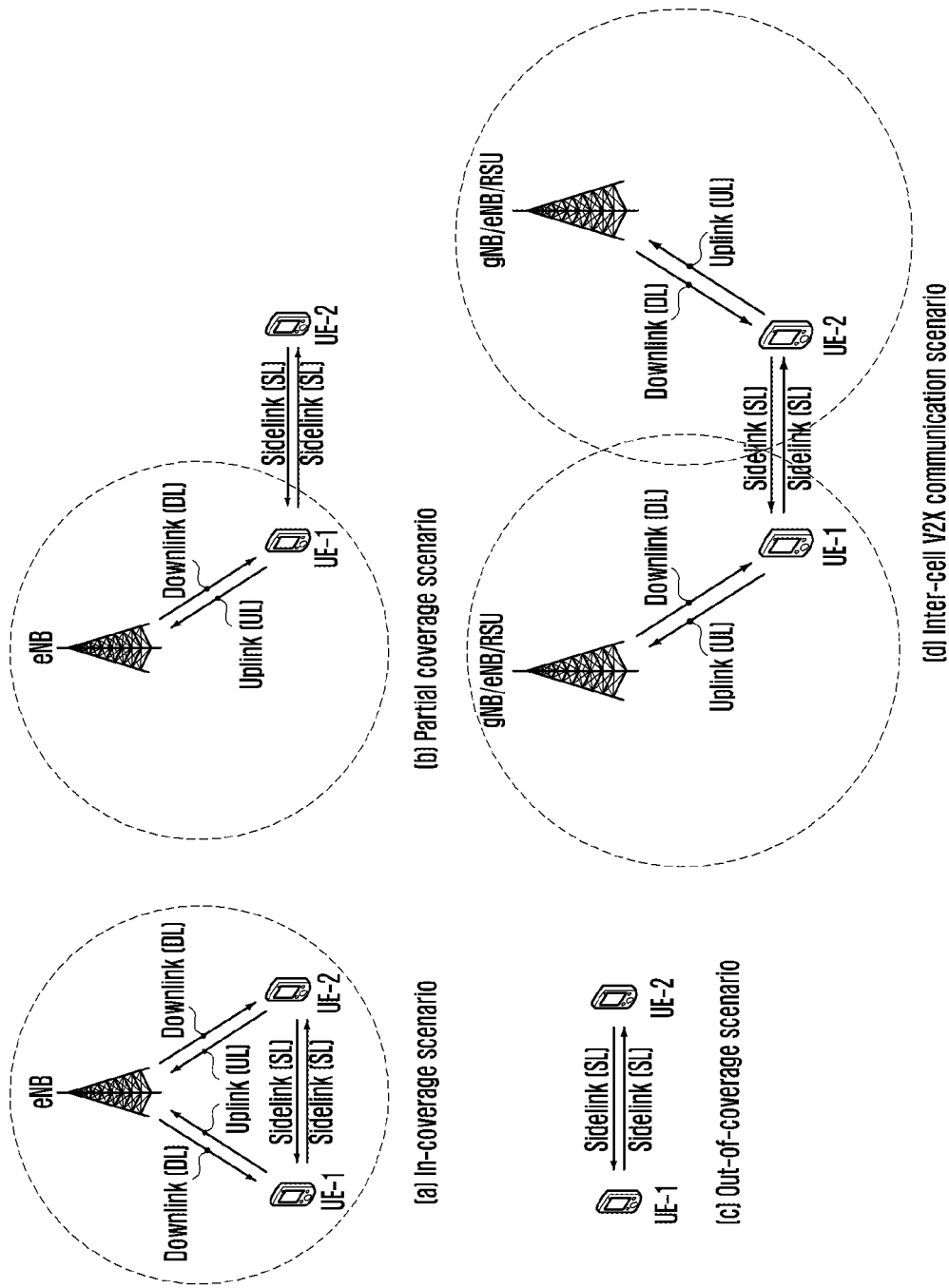
FIG. 10 is a diagram illustrating a system according to an embodiment of the disclosure.

FIG. 10 is a diagram illustrating a system according to an embodiment of the disclosure.

With reference to (a) of FIG. 10, shown is a case (In-coverage scenario) in which all V2X UEs (UE-1, UE-2) are located within the coverage of a base station (gNB/eNB/RSU). All the V2X UEs (UE-1, UE-2) may receive data and control information from the base station (gNB/eNB/RSU) through a downlink (DL) or transmit data and control information to the base station through an uplink (UL). The data and control information may be data and control information for V2X communication or data and control information for general cellular communication other than V2X communication. Also, in (a) of FIG. 10A, the V2X UEs (UE-1, UE-2) may transmit and receive data and control information for V2X communication through a sidelink (SL).

With reference to (b) of FIG. 10, shown is a case (Partial coverage scenario) in which, of the V2X UEs, the UE-1 is located within the coverage of a base station (gNB/eNB/RSU) and the UE-2 is located outside the coverage of the base station (gNB/eNB/RSU). The UE-1 located within the coverage of the base station may receive data and control information from the base station through the downlink (DL) or transmit data and control to the base station through the uplink (UL). The UE-2 located outside the coverage of the base station cannot receive data and control information from the base station through the downlink and cannot transmit data and control information to the base station through the uplink. The UE-2 may transmit and receive data and control information for V2X communication to and from the UE-1 through the sidelink (SL).

In FIG. 10, (c) shows a case in which all the V2X UEs (UE-1, UE2) are located outside the coverage of the base station (gNB/eNB/RSU). The UEs (UE-1, UE-2) cannot receive data and control information from the base station through the downlink (DL) and cannot receive data and control information from the base station through the uplink (UL). On the other hand, the UE-1 and the UE-2 may transmit/receive data and control information for V2X communication through the sidelink (SL).

In FIG. 10, (d) shows a case (Inter-cell V2X communication) in which a V2X transmitting UE and a V2X receiving UE are connected to (RRC connection state) or camping in (RRC connection release state, that is, RRC idle state) different base stations (gNB/eNB/RSU). In this case, the UE-1 may be the V2X transmitting UE, and the UE-2 may be the V2X receiving UE. Alternatively, the UE-1 may be the V2X receiving UE, and the UE-2 may be the V2X transmitting UE. The UE-1 may receive a V2X dedicated System Information Block (SIB) from the base station which the UE-1 is connected to or camping in, and the UE-2 may receive a V2X dedicated SIB from another base station which the UE-2 is connected to or camping in. In this case, information of the V2X dedicated SIB received by the UE-1 and information of the V2X dedicated SIB received by the UE-2 may be different from each other. Therefore, in order to perform V2X communication between UEs located in different cells, it is necessary to unify the received SIB information.

In FIG. 10, a V2X system composed of two UEs (UE-1, UE-2) is described as an example for convenience of explanation, but various numbers of UEs may participate in the V2X system. In addition, the uplink (UL) and downlink (DL) between the base station (eNB/gNB/RSU) and the V2X UEs (UE-1, UE-2) may be referred to as a Uu interface, and the sidelink (SL) between the V2X UEs (UE-1, UE-2) may be referred to as a PC5 interface. Therefore, in the disclosure, these terms may be used interchangeably.

Meanwhile, in the disclosure, the UE may refer to a vehicle supporting vehicle-to-vehicle (V2V) communication, a vehicle or pedestrian's handset (e.g., a smartphone) supporting vehicle-to-pedestrian (V2P) communication, a vehicle supporting vehicle-to-network (V2N) communication, or a vehicle supporting vehicle-to-infrastructure (V2I) communication. In addition, in the disclosure, the UE may also refer to a road side unit (RSU) equipped with a UE function, an RSU equipped with a base station function, or an RSU equipped with a part of base station function and a part of UE function.

In the disclosure, a sidelink control channel may be referred to as a physical sidelink control channel (PSCCH), and a sidelink shared channel or data channel may be referred to as a physical sidelink shared channel (PSSCH). In addition, a broadcast channel broadcasted together with a synchronization signal may be referred to as a physical sidelink broadcast channel (PSBCH), and a channel for feedback transmission may be referred to as a physical sidelink feedback channel (PSFCH). However, PSCCH or PSSCH may be used for feedback transmission. The above channels may be referred to as LTE-PSCCH, LTE-PSSCH, NR-PSCCH, NR-PSSCH, etc. according to a communication system. In the disclosure, a sidelink may refer to a link between UEs, and a Uu link may refer to a link between a base station and a UE.

Figure 11:
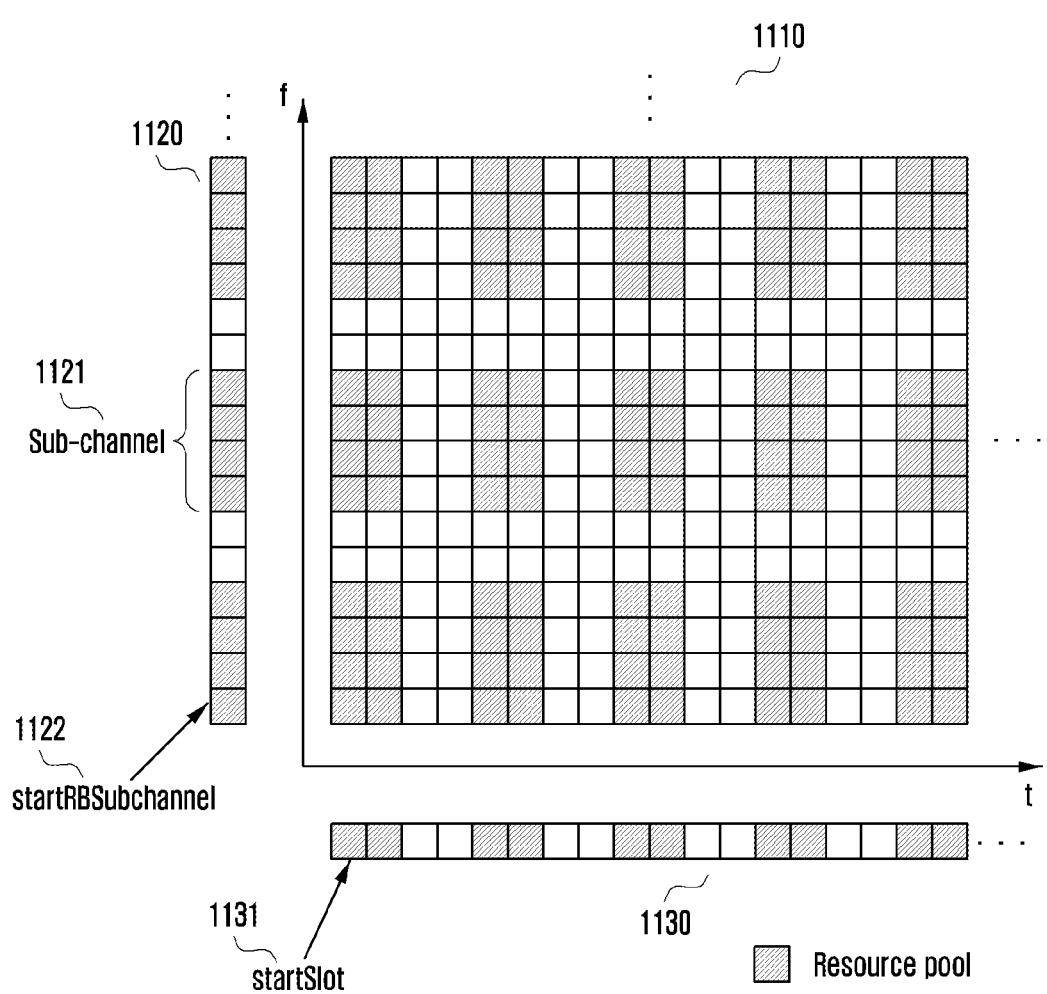
FIG. 11 is a diagram illustrating a resource pool defined as a set of resources on time and frequency used for sidelink transmission and reception according to an embodiment of the disclosure.

FIG. 11 is a diagram illustrating a resource pool defined as a set of resources on time and frequency used for sidelink transmission and reception according to an embodiment of the disclosure.

With reference to 1110 of FIG. 11, shown is a case in which the resource pool is non-contiguously allocated in time and frequency. Although the disclosure describes a case in which the resource pool is non-contiguously allocated on frequency, the resource pool may also be allocated contiguously on frequency.

With reference to 1120 of FIG. 11, non-contiguous resource allocation may be made on frequency. The granularity of resource allocation on frequency may be a physical resource block (PRB).

Also, with reference to 1121 of FIG. 11, resource allocation on frequency may be made based on a sub-channel. The sub-channel may be defined as a resource allocation unit on frequency composed of a plurality of RBs. Specifically, the sub-channel may be defined as an integer multiple of an RB. With reference to 1121 of FIG. 11, shown is a case in which the size of the sub-channel is four contiguous PRBs. The size of the sub-channel may be configured differently. Although one sub-channel is normally composed of contiguous PRBs, it is not necessarily composed of contiguous PRBs. The sub-channel may be a basic unit of resource allocation for a physical sidelink shared channel (PSSCH) or a physical sidelink control channel (PSCCH), and the size of the sub-channel may be configured differently depending on whether the corresponding channel is the PSSCH or the PSCCH. Also, the sub-channel may be referred to as a resource block group (RBG). Hereinafter, methods of allocating a non-contiguous resource pool on frequency and dividing the allocated resource pool into a plurality of sub-channels will be described.

With reference to 1122 of FIG. 11, startRBSubchanel may indicate the start position of a sub-channel on frequency in the resource pool.

A resource block, which is a frequency resource belonging to a resource pool for PSSCH in the LTE V2X system, may be determined in the following method.

The resource block pool consists of $N_{subCH}$ sub-channels where $N_{subCH}$ is given by higher layer parameter numSub-Channel.

The sub-channel m for m=0, 1, ..., $N_{subCH}$-1 consists of a set of $n_{subCHsize}$ contiguous resource blocks with the physical resource block number $n_{PRB}=N_{subCHRBstart}+m*n_{subCHsize}+j$ for j=0, 1, ..., $n_{subCHsize}$-1 where $n_{subCHRBstart}$ and $n_{subCHsize}$ are given by higher layer parameters startRBSub-channel and sizeSub-channel, respectively When $N_{subCH}$ is given by higher layer parameter num-Subchannel, the resource block pool consists of $N_{subCH}$ sub-channels.

When $n_{subCHRBstart}$ and $n_{subCHsize}$ are given by higher layer parameters startRBSubchannel and sizeSub-channl, respectively, the sub-channel m for m=0, 1, ..., $N_{subCH}$-1 consists of contiguous resource blocks $n_{subCHsize}$ for physical resource block numbers j=0, 1, ..., $n_{subCHsize}$-1 and $n_{PRB}=n_{subCHRBstart}+m*n_{subCHsize}+j$.

Reference numeral 1130 of FIG. 11 indicates a case in which non-contiguous resource allocation is made on time. The granularity of resource allocation on time may be a slot. Although the disclosure describes a case in which the resource pool is allocated non-contiguously in time, the resource pool may also be allocated contiguously in time.

With reference to 1131 of FIG. 11, startSlot may indicate a start position of a slot in time in the resource pool.

Subframes $(t_0^{SL}, t_1^{SL}, ..., t_T^{SL})$ which are time resources belonging to the resource pool for PSSCH in the LTE V2X system, may be determined in the following method.
$0 \leq t_i^{SL} < 10240$ The subframe index is relative to subframe #0 of the radio frame corresponding to SFN 0 of the serving cell or DFN 0 (described in [11]), the set includes all the subframes except the following subframes, subframes in which SLSS resource is configured, downlink subframes and special subframes if the sidelink transmission occurs in a TDD cell, reserved subframes which are determined by the following steps:

1) The remaining subframes excluding $N_{slss}$ and $N_{dssf}$ subframes from the set of all the subframes are denoted by $(I_0, I_1, ..., I_{(10240-N_{slss}-N_{dssf}-1)})$ arranged in increasing order of subframe index, where $N_{slss}$ is the number of subframes in which SLSS resource is configured within 10240 subframes and $N_{dssf}$ is the number of downlink subframes and special subframes within 10240 subframes if the sidelink transmission occurs in a TDD cell.

2) A subframe $I_r(0 \leq r < (10240-N_{slss}-N_{dssf}))$ belongs to the reserved subframes if $$r = \left\lfloor \frac{m \cdot (10240 - N_{slss} - N_{dssf})}{N_{reserved}} \right\rfloor$$

where m=0, ..., $N_{reserved}$-1 and $N_{reserved}=(10240-N_{slss}-N_{dssf})$ mod $L_{bitmap}$. Here, $L_{bitmap}$ the length of the bitmap is configured by higher layers.

The subframes are arranged in increasing order of subframe index.

A bitmap $(b_0, b_1, ..., b_{L_{bitmap}-1})$ associated with the resource pool is used where $L_{bitmap}$ the length of the bitmap is configured by higher layers.

A subframe $t_k^{SL}$ $(0 \leq k < (10240-N_{slss}-N_{dssf}-N_{reserved}))$ belongs to the subframe pool if $b_{k'}=1$ where k'=k mod $L_{bitmap}$.

For congestion control in the sidelink of V2X, the UE may measure a channel busy ratio (CBR). Based on the CBR measurement result of the UE, a setting range of transmission parameters may be determined. Determining the transmission parameters based on the CBR is to increase a transmission success probability of the UE when the UE accesses a channel, depending on whether the channel is congested. In addition, the CBR measured by the UE may be reported to the base station. Reporting the CBR to the base station may be limited to an RRC-connected UE. Using CBR information reported by the UE, the base station may perform sidelink scheduling and congestion control. The CBR measured by the UE in slot n may be defined as follows.

- It is defined as a ratio of sub-channels in which a sidelink received signal strength indicator (S-RSSI) measured by the UE in the slot [n–X, n–1] in the resource pool for PSSCH exceeds a (pre-)configured threshold.
- Here, a slot index is based on a physical slot index.
- X is a parameter that determines the measurement interval of CBR and may be fixed to a specific value such as 100 or (pre-)configured.
- S-RSSI refers to the received signal strength, indicates how much power (in [W]) is received by the receiving UE, and is observed by effective OFDM symbol positions in a slot of a sidelink and a configured sub-channel.

Based on the definition of the CBR, the congestion of the corresponding channel can be identified by a measured CBR value. The measured CBR value may be quantized and mapped to a CBR level, and the setting range of transmission parameters may be determined by the CBR level. The transmission parameters determined by the CBR level may include parameters related to transmission power (Max Tx power), a channel occupancy ratio (CR) limit, a PSSCH modulation and coding scheme (PSSCH MCS) range, PSSCH rank indicator (PSSCH RI) range, PSSCH resource block (PSSCH RB) allocation range, a PSSCH retransmission range, and the like. When the measured CBR level is high, this means a congested environment in which a lot of UEs access the corresponding channel and perform transmission. In this case, it may be advantageous to set the range of the transmission parameters in a direction to increase a transmission probability of a transmitting UE. The transmission parameter setting range corresponding to the CBR level may be (pre-)configured. For example, the transmission parameter setting range corresponding to the CBR level may be configured in V2X SIB, Uu-RRC, or PC5-RRC. Examples of a Tx parameter set determined by the CBR level are shown in Table 12 and Table 13. With reference to Table 12, there is shown a method of configuring the minimum and maximum setting ranges for PSSCH MCS, PSSCH RI, PSSCH RB, and PSSCH retransmission related parameters. With reference to Table 13, a method of configuring the range of values that can be set to a maximum for all parameters is shown.

TABLE 12

Example 1: Tx parameter set determined by CBR level

| Parameter | Value | |
|---|---|---|
| Max Tx power | max | |
| CR limit | max | |
| PSSCH MCS range | min | max |
| PSSCH RI range | min | max |
| PSSCH RB range | min | max |
| PSSCH retransmission range | min | max |

TABLE 13

Example 2: Tx parameter set determined by CBR level

| Parameter | Value |
|---|---|
| Max Tx power | max |
| CR limit | max |
| Max PSSCH MCS | max |
| Max PSSCH RI | max |
| Max PSSCH RB | max |
| Max PSSCH retransmission | max |

Figure 12:
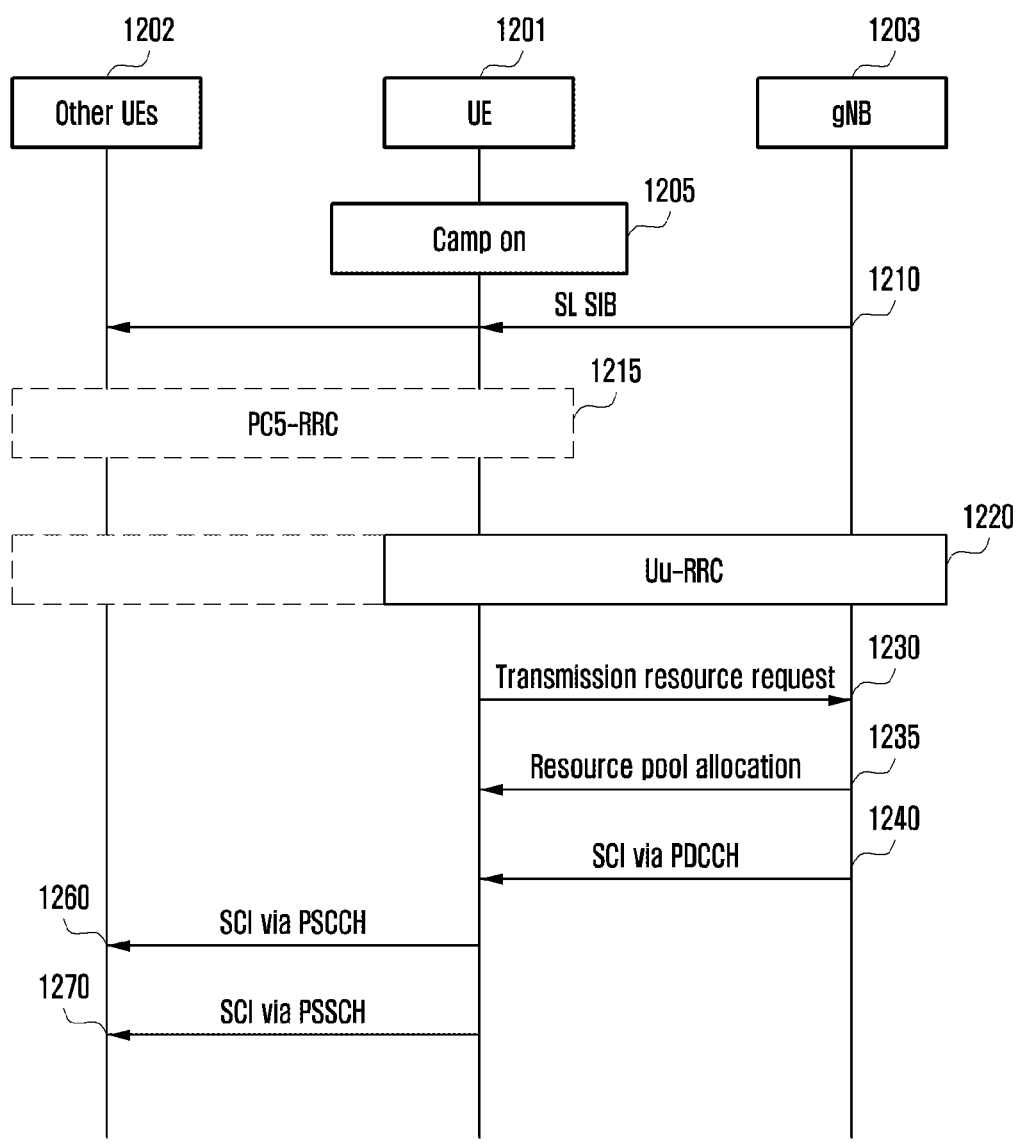
FIG. 12 is a flow diagram illustrating a method of scheduled resource allocation (mode 1) in a sidelink according to an embodiment of the disclosure.

FIG. 12 is a flow diagram illustrating a method of scheduled resource allocation (mode 1) in a sidelink according to an embodiment of the disclosure.

The scheduled resource allocation (mode 1) method is a method in which a base station (gNB) allocates resources used for sidelink transmission to RRC-connected UEs through dedicated scheduling. The scheduled resource allocation (mode 1) method is effective for interference management and resource pool management because the base station can manage sidelink resources.

With reference to FIG. 12, a UE 1201 that is camping on 1205 may receive 1210 an SL sidelink system information block (SL SIB) from a base station 1203. The system information may include resource pool information for transmission/reception, configuration information for a sensing operation, information for configuring synchronization, information for inter-frequency transmission/reception, and the like. Also, other UEs 1202 may receive the SL SIB as shown in FIG. 12, but the other UEs 1202 may not receive the SL SIB unlike FIG. 12. When data traffic for V2X is generated in the UE 1201, the UE 1201 may perform an RRC connection 1220 with the base station 1203. Here, the RRC connection between the UE and the base station may be referred to as a Uu-RRC 1220. Alternatively, the Uu-RRC connection may be performed before the data traffic generation for V2X. The UE 1201 may request 1230 a transmission resource for performing V2X communication with the other UEs 1202 from the base station 1203. At this time, the UE 1201 may request 1230 the transmission resource for V2X communication from the base station 1203 by using an RRC message or MAC CE. Here, as the RRC message, the SidelinkUEInformation or UEAssistanceInformation message may be used. Meanwhile, a MAC CE may be a buffer status report MAC CE of a new format (at least including an indicator indicating a buffer status report for V2X communication and information about the size of data buffered for D2D communication). For the detailed format and contents of the buffer status report used in 3GPP, refer to 3GPP standard TS36.321 "E-UTRA MAC Protocol Specification". The base station 1203 may allocate a V2X transmission resource to the UE 1201 through a dedicated Uu-RRC message. The dedicated Uu-RRC message may be included in the RRCConnectionReconfiguration message. The allocated resource may be a V2X resource through Uu or a resource for PC5 depending on the type of traffic requested by the UE 1201 or whether the link is congested. For resource allocation determination, the UE may additionally transmit ProSe per packet priority (PPPP) or logical channel ID (LCID) information of V2X traffic through UEAssistanceInformation or MAC CE. Because the base station 1203 also knows information about resources used by the other UEs 1202, the base station 1203 may allocate 1235 the remaining resource pool among the resources requested by the UE 1201. The base station 1203 may instruct 1240 the UE 1201 of final scheduling with DCI transmission via PDCCH.

In case of broadcast transmission, the UE 1201 may broadcast 1260 sidelink control information (SCI) to the other UEs 1202 via PSCCH without additional sidelink RRC configuration. Also, data may be broadcasted 1270 to the other UEs 1202 via PSSCH.

Contrary to this, in case of unicast and groupcast transmission, the UE 1201 may perform one-to-one RRC connection with the other UEs 1202. Here, the RRC connection between UEs may be referred to as PC5-RRC to be distinguished from the Uu-RRC. Even in case of groupcast, the PC5-RRC 1215 may be individually connected between UEs in a group. Although the connection of the PC5-RRC 1215 is illustrated as an operation after the SL SIB transmission 1210 in FIG. 12, it may be performed at any time before the SL SIB transmission 1210 or before the SCI transmission 1260. If the RRC connection is required between UEs, the UE 1201 may perform the PC5-RRC 1215 connection of sidelink and transmit 1260 sidelink control information (SCI) to the other UEs 1202 via PSCCH in unicast or groupcast. In this case, the groupcast transmission of SCI may be interpreted as group SCI. In addition, data may be transmitted 1270 to the other UEs 1202 via PSSCH in unicast or groupcast.

Figure 13:
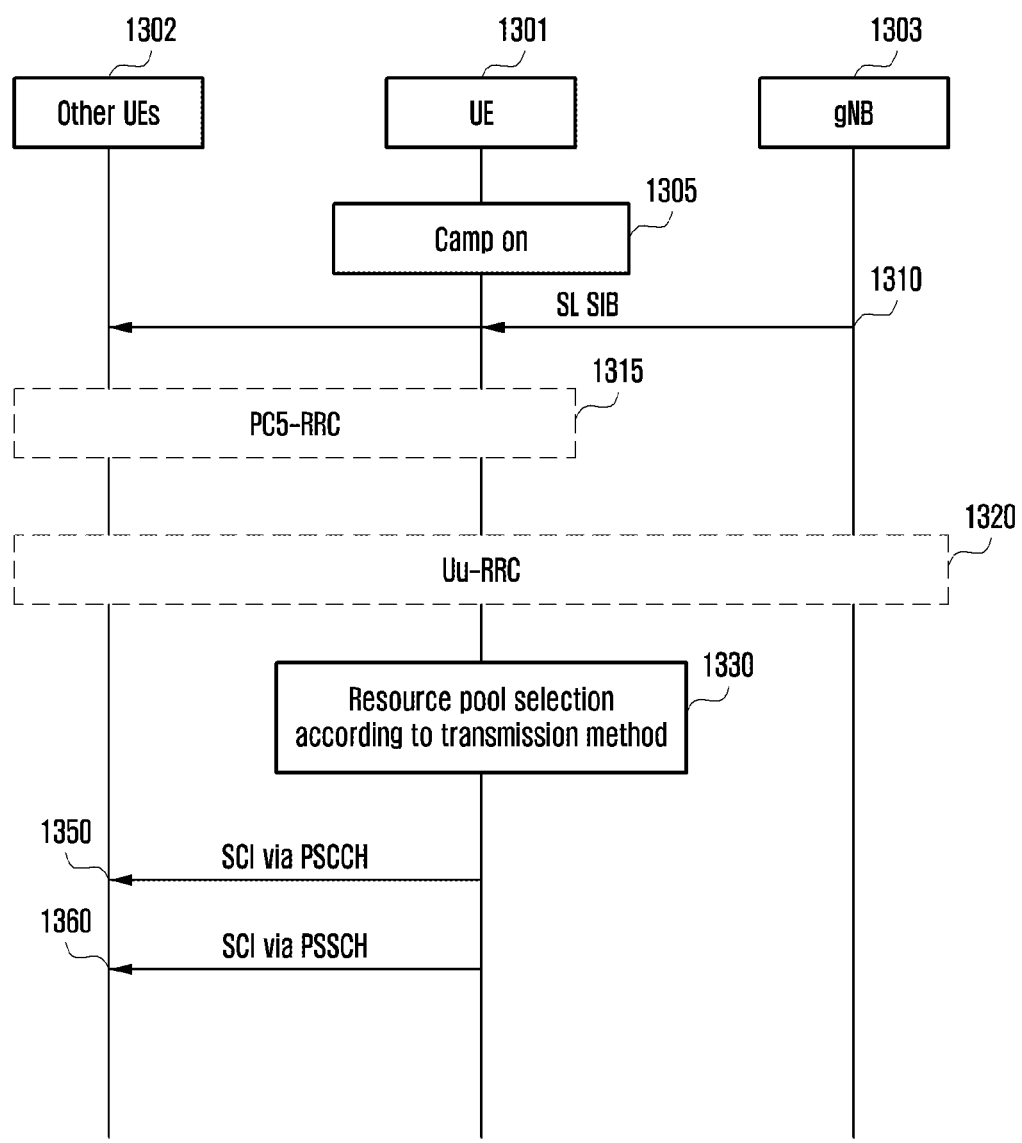
FIG. 13 is a flow diagram illustrating a method of UE autonomous resource allocation (mode 2) in a sidelink according to an embodiment of the disclosure.

FIG. 13 is a flow diagram illustrating a method of UE autonomous resource allocation (mode 2) in a sidelink according to an embodiment of the disclosure.

In the UE autonomous resource allocation (mode 2) method, a base station (gNB) 1303 may provide a sidelink transmission/reception resource pool for V2X with system information, and a UE 1301 may select a transmission resource in accordance with a given rule. A resource selection method may include zone mapping, sensing-based resource selection, random selection, and the like. Contrary to the scheduled resource allocation (mode 1) method in which the base station is directly involved in resource allocation as shown in FIG. 12, in FIG. 13 the UE 1301 autonomously selects a resource based on the resource pool previously received from the base station 1303 through system information and transmits data. In V2X communication, the base station 1303 may allocate various types of resource pools (a V2V resource pool, a V2P resource pool) for the UE 1301. The allocable resource pool may be a resource pool in which the UE can autonomously select an available resource pool after sensing resources used by other neighboring UEs 1302, a resource pool in which the UE randomly selects a resource from a preconfigured resource pool, or the like.

The UE 1301 that is camping on 1305 may receive 1310 an SL sidelink system information block (SL SIB) from the base station 1303. The system information may include resource pool information for transmission/reception, configuration information for a sensing operation, information for configuring synchronization, information for inter-frequency transmission/reception, and the like. Also, other UEs 1302 may receive the SL SIB as shown in FIG. 13, but the other UEs 1302 may not receive the SL SIB unlike FIG. 13. A difference in operation between FIGS. 12 and 13 is that in FIG. 12 the base station 1203 and the UE 1201 operate in a state that RRC is connected, whereas in FIG. 13 they may operate even in an idle mode 1320 that RRC is not connected. Also, in the idle mode 1320 without RRC connection, the base station 1303 may operate without directly participating in resource allocation so that the UE 1301 autonomously selects transmission resources. When data traffic for V2X is generated in the UE 1301, the UE 1301 may select 1330 a resource pool in the time/frequency domain according to a configured transmission operation from among the resource pools received from the base station 1303 through system information.

In case of broadcast transmission, the UE 1301 may broadcast 1350 sidelink control information (SCI) to the other UEs 1302 via PSCCH without additional sidelink RRC configuration. Also, data may be broadcasted 1360 to the other UEs 1302 via PSSCH.

Contrary to this, in case of unicast and groupcast transmission, the UE 1301 may perform one-to-one RRC connection with the other UEs 1302. Here, the RRC connection between UEs may be referred to as PC5-RRC to be distinguished from the Uu-RRC. Even in case of groupcast, the PC5-RRC may be individually connected between UEs in a group. This may be similar to the connection of the RRC layer in the NR uplink and downlink between the base station and the UE, and the connection of the RRC layer in the sidelink may be referred to as PC5-RRC. Through the PC5-RRC connection, UE capability information for sidelink may be exchanged, or configuration information required for signal transmission/reception may be exchanged. Although the connection of the PC5-RRC 1315 is illustrated as an operation after the SL SIB transmission 1310 in FIG. 13, it may be performed at any time before the SL SIB transmission 1310 or before the SCI transmission 1350. If the RRC connection is required between UEs, the UE 1301 may perform the PC5-RRC 1315 connection of sidelink and transmit 1350 sidelink control information (SCI) to the other UEs 1302 via PSCCH in unicast or groupcast. In this case, the groupcast transmission of SCI may be interpreted as group SCI. In addition, data may be transmitted 1360 to the other UEs 1302 via PSSCH in unicast or groupcast.

In the disclosure, a sensing window A and a sensing window B are defined in order to effectively perform sensing in a situation where periodic and aperiodic traffic coexist.

Figure 14A:
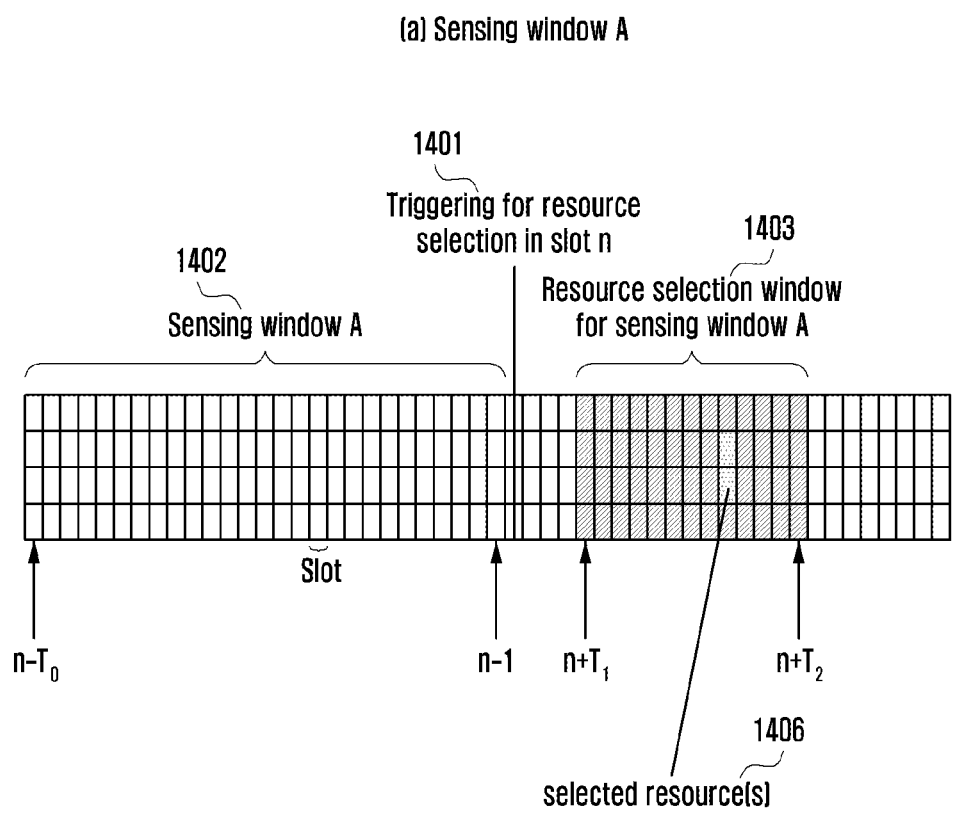
FIG. 14A is a diagram illustrating a configuration method of a sensing window A in UE autonomous resource allocation (mode 2) of a sidelink according to an embodiment of the disclosure.

FIG. 14A is a diagram illustrating a configuration method of a sensing window A in UE autonomous resource allocation (mode 2) of a sidelink according to an embodiment of the disclosure.

As shown in FIG. 14A, when triggering 1401 to select a transmission resource occurs in slot n, the sensing window A 1402 may be defined as follows.

- *The sensing window A 1402 may be defined as a slot interval of [n−T0, n−1]. Here, T0 may be determined as a fixed value or may be determined to be configurable.
- **For example, when T0 is determined as a fixed value, it may be expressed as T0=1000*2µ for periodic traffic. Contrary to this, a fixed value of T0=100*2µ may be configured for aperiodic traffic. The fixed T0 value may be changed to a different value depending on traffic characteristics considered and may be fixed to the same value for periodic and aperiodic traffic. Here, u is an index corresponding to numerology and may be configured to the following values according to subcarrier spacing (SCS).
- ***SCS=15 kHz, µ=0
- ***SCS=30 kHz, µ=1
- ***SCS=60 kHz, µ=2
- ***SCS=120 kHz, µ=3
- **For a case in which T0 is determined to be configurable, such configuration may be indicated through a sidelink system information block (SL SIB) or UE-specific higher level signaling. When indicated through the SL SIB, a corresponding value may be configured in resource pool information of the system information.

When T0 is configured in the resource pool information, a constant T0 may always be used in the resource pool.
* In the sensing window A 1402, SCI decoding and sidelink measurement for other UEs may be performed.
 In the sensing window A 1402**, resource allocation information for other UEs and QoS information for packets may be obtained from the received SCI. Here, the resource allocation information may include a reservation interval for resources. Also, the QoS information may include latency, reliability, minimum required communication range for transmitted traffic, and priority information according to data rate requirements or the like. Also, location information about other UEs may be obtained from the received SCI. Also, a TX-RX distance may be calculated from the location information about other UEs and my location information.
 In the sensing window A 1402**, sidelink reference signal received power (SL RSRP) may be measured from the received SCI.
 In the sensing window A 1402**, sidelink received signal strength indicator (SL RSSI) may be measured.

The sensing window A 1402 may be used for a main purpose of determining a resource for UE autonomous resource allocation (mode 2) through sensing for periodic traffic. The UE identifies periodic resource allocation information of other UEs through SCI decoding, and upon determining that it is ineffective to allocate transmission resources to resources to be used by other UEs using sidelink measurement results such as SL RSRP or SL RSSI, it may exclude that resource from a resource selection window 1403. As shown in FIG. 14A, when triggering 1401 to select a transmission resource occurs in slot n, the resource selection window 1403 may be defined as follows.
* The resource selection window 1403 may be defined as a slot interval of [n+T1, n+T2]. Here, T1 and T2 may be determined as fixed values or may be determined to be configurable. In contrast, T1 and T2 may be determined as fixed ranges, and the UE may configure appropriate values within the fixed range in consideration of implementation.
** As an example in which T1 and T2 are determined as fixed ranges and the UE configures appropriate values within the fixed range in consideration of implementation, it may be configured with UE implementation in the range of T1≤4 and 20≤T2≤100
* A final transmission resource 1406 may be selected within the resource selection window 1403 by using the sensing result performed in the sensing window A 1402.

If sensing is performed using only the sensing window A 1402 as in FIG. 14A and transmission resource selection is performed through this, the following transmission resource selection method may be used.
* Transmission resource selection method-1
 Step-1: In the resource selection window 1403**, the number of resource candidates Mtotal that can be resource-allocated may be determined based on resource pool information. For details on this, refer to the first embodiment.
 Step-2: Using the sensing result in the sensing window A 1402, resources occupied by other UEs and judged to be ineffective to use are excluded in the resource selection window 1403** and thus X (≤Mtotal) resource candidates may be left. A method of excluding resources through SCI decoding and sidelink measurement for other UEs may be used.
 Step-3: A resource candidate list X is reported to the UE higher layer, and a final transmission resource may be randomly selected 1406** from the X candidates in the UE higher layer.

Figure 14B:
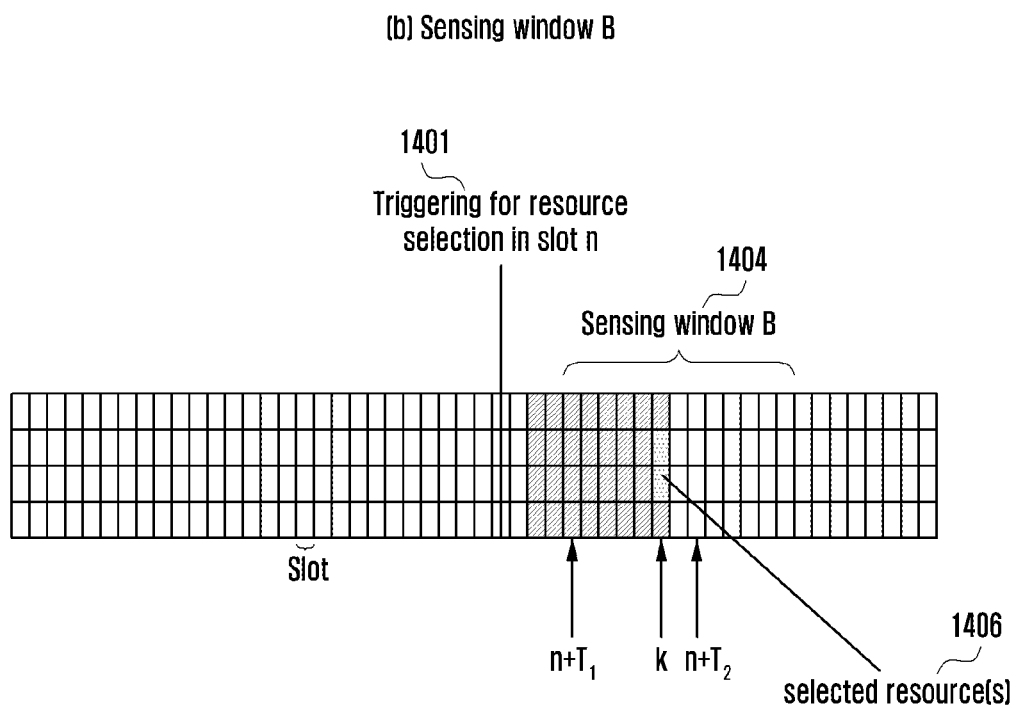
FIG. 14B is a diagram illustrating a configuration method of a sensing window B in terminal autonomous resource allocation (mode 2) of a sidelink according to an embodiment of the disclosure.

FIG. 14B is a diagram illustrating a configuration method of a sensing window B in UE autonomous resource allocation (mode 2) of a sidelink according to an embodiment of the disclosure.

As shown in FIG. 14B, when triggering 1401 to select a transmission resource occurs in slot n, the sensing window B 1404 may be defined as follows.
* The sensing window B 1404 may be defined as a slot interval of [n+T1', n+T2']. Here, T1' and T2' may be determined as fixed values or may be determined to be configurable. Alternatively, T1' and T2' may be determined as fixed ranges, and the UE may configure appropriate values within the fixed range in consideration of implementation. When k indicates a slot in which a resource is finally selected, the sensing window B 1404 is terminated at the k slot, and the sensing window B 1404 becomes [n+T1', k].
 T1' and T2' may be configured to have the same values as T1 and T2 of the resource selection window 1403**, respectively, or may be configured to have different values.
** For example, when T1'=0 is configured, it means that sensing is performed from the triggering slot n for selecting a transmission resource.
 The sensing window B 1404** may be configured with one or more slots by the configured values of T1' and T2'.
* In the sensing window B 1404, SCI decoding and sidelink measurement for other UEs may be performed.
 For details of the sensing operation in the sensing window B 1404**, refer to the second and third embodiments.

The sensing window B 1404 may be used for the purpose of determining a resource for UE autonomous resource allocation (mode 2) through sensing for periodic and aperiodic traffic in addition to the sensing window A. In the sensing window B 1404 configured after the triggering slot n for selecting the transmission resource, by using sidelink measurement for a slot in which an actual transmission resource can be allocated, it is possible to sense aperiodic traffic that cannot be predicted in the sensing window A. Sensing through the sensing window B 1404 may be understood as an operation of sensing the traffic sensed in every slot regardless of whether the traffic is periodic or aperiodic. If sensing is performed using the sensing window B 1404 as shown in FIG. 14B and transmission resource selection is performed through this, the following transmission resource selection method may be used.
* Transmission resource selection method-2
 Step-1: Sensing is performed in the corresponding slot within the sensing window B 1404** to determine whether the corresponding resource is idle.
*** A resource allocation unit on frequency may be A (≥1) sub-channels or may be defined as all sub-channels. Based on the resource allocation unit on frequency, the number of resource candidates Ntotal that can be resource-allocated in a corresponding slot may be determined.
*** Sensing may be performed through SCI decoding and sidelink measurement.
 Step-2-1: If the corresponding resource is determined to be idle through sensing in Step-1, a transmission resource 1406** may be finally determined among the number of resource candidates Ntotal that can be resource-allocated in the corresponding slot.
** Step-2-2: If all the corresponding resources are determined to be busy through sensing in Step-1, the following operation can be selected.
* If the next slot is also configured as the sensing window B 1404**, Step-1 may be performed in the next slot.
* If the next slot is not configured as the sensing window B 1404**, the following operation may be considered.
** In the current slot, the transmission resource 1406** may be finally determined by using QoS information or an energy detection result. The QoS information may include priority, latency, reliability, proximity service (ProSe) per-packet priority (PPPP), ProSe per-packet reliability (PPPR), minimum required communication range for transmitted traffic, and priority information according to data rate requirements or the like. Priority may be information including PPPP and PPPR, may be a value selected within a range of given values, and data required to be transmitted in the sidelink may have one priority value.
**** Transmission in the current slot may be canceled and a Backoff operation may be performed.

As defined in FIGS. 14A and 14B, the sensing window A and the sensing window B may be distinguished based on the timing of triggering to select a transmission resource. Specifically, based on the triggering slot n for selecting a transmission resource, a sensing interval configured before the slot n may be defined as the sensing window A, and a sensing interval configured after the slot n may be defined as the sensing window B.

Figure 14C:
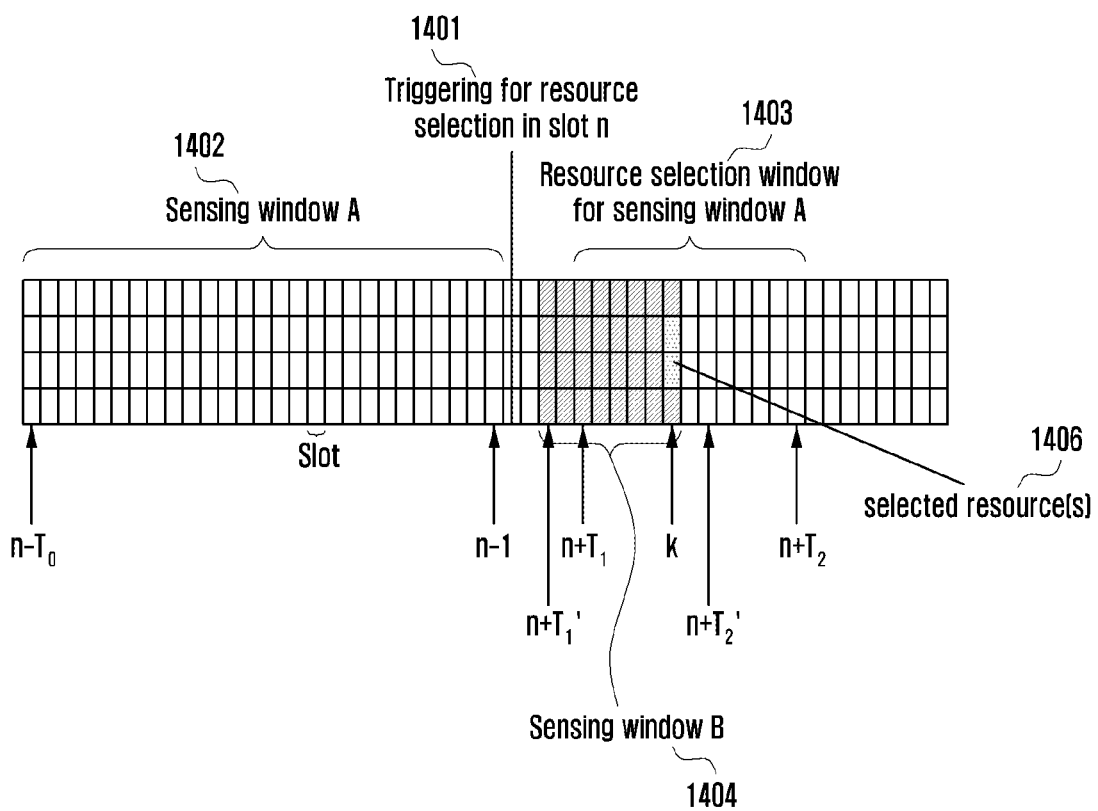
FIG. 14C is a diagram illustrating a configuration method of a sensing window A and a sensing window B in terminal autonomous resource allocation (mode 2) of a sidelink according to an embodiment of the disclosure.

FIG. 14C is a diagram illustrating a configuration method of a sensing window A and a sensing window B in UE autonomous resource allocation (mode 2) of a sidelink according to an embodiment of the disclosure.

When triggering 1401 to select a transmission resource occurs in slot n, the sensing window A 1402 and the sensing window B 1404 are as defined above. In case that sensing is performed using both the sensing window A 1402 and the sensing window B 1404 as in FIG. 14C and transmission resource selection is performed through this, the following transmission resource selection method may be used.

* Transmission resource selection method-3
 Step-1: In the resource selection window 1403**, the number of resource candidates Mtotal that can be resource-allocated may be determined based on resource pool information.
 Step-2: Using the sensing result in the sensing window A 1402, resources occupied by other UEs and judged to be ineffective to use are excluded in the resource selection window 1403** and thus X (≤Mtotal) resource candidates may be left. A method of excluding resources through SCI decoding and sidelink measurement for other UEs may be used.
** Step-3: A resource candidate list X is reported to the UE higher layer, and Y candidates may be randomly down-selected from among the X candidates in the higher layer.
 Step-4-1: When the sensing window B 1404 is included in the resource selection window 1403, the UE may select the final transmission resource 1406 from among the Y candidates determined in the higher layer through the transmission resource selection method-2 by using the sensing result of the sensing window B 1404** in the physical layer.
* This case in which the sensing window B 1404 is included in the resource selection window 1403 corresponds to an interval of [n+T1, k] in FIG. 14C**. This condition may be determined by configuration of T1 and T2 and T1' and T2'.
 Step-4-2: When the sensing window B 1404 is not included in the resource selection window 1403, the final transmission resource 1406 may be selected through the transmission resource selection method-2 by using the sensing result of the sensing window B 1404** in the physical layer.
* This case in which the sensing window B 1404 is not included in the resource selection window 1403 may correspond to an interval of [n+T1', n+T1-1] in FIG. 14C**. This condition may be determined by configuration of T1 and T2 and T1' and T2'.

In the transmission resource selection method-3, the step (Step-3) of selecting Y candidates in the higher layer may be omitted, and the following method may be used.

* Transmission resource selection method-4
 Step-1: In the resource selection window 1403**, the number of resource candidates Mtotal that can be resource-allocated may be determined based on resource pool information.
 Step-2: Using the sensing result in the sensing window A 1402, resources occupied by other UEs and judged to be ineffective to use are excluded in the resource selection window 1403** and thus X (<Mtotal) resource candidates may be left. A method of excluding resources through SCI decoding and sidelink measurement for other UEs may be used.
 Step-3-1: When the sensing window B 1404 is included in the resource selection window 1403, the UE may select the final transmission resource 1406 from among the X candidates through the transmission resource selection method-2 by using the sensing result of the sensing window B 1404** in the physical layer.
* This case in which the sensing window B 1404 is included in the resource selection window 1403 corresponds to an interval of [n+T1, k] in FIG. 14C**. This condition may be determined by configuration of T1 and T2 and T1' and T2'.
 Step-3-2: When the sensing window B 1404 is not included in the resource selection window 1403, the final transmission resource 1406 may be selected through the transmission resource selection method-2 by using the sensing result of the sensing window B 1404** in the physical layer.
* This case in which the sensing window B 1404 is not included in the resource selection window 1403 may correspond to an interval of [n+T1', n+T1-1] in FIG. 14C**. This condition may be determined by configuration of T1 and T2 and T1' and T2'.

In case that the sensing window A 1402 and the sensing window B 1404 are configured together, the final resource selection may be determined by the resource selection window 1403 and the sensing window B 1404. The proposed transmission resource selection method-3 or transmission resource selection method-4 is a method of performing sensing in a situation where the sensing window A 1402 and the sensing window B 1404 are configured together and thereby periodic and aperiodic traffic coexist, and optimizing the transmission resource selection through this.

In the UE autonomous resource allocation (mode 2) method of the sidelink described above, the implementation of the sensing and transmission resource selection operations may be made in various ways. For example, in case that the sensing window A and the sensing window B are configured together, the UE may be implemented such that it is always performing sensing for the sensing window A and, when triggering to select a transmission resource occurs in slot n, performs sensing for the sensing window B to select the final transmission resource. This operation in which the UE is always sensing for the sensing window A can use the sensing result of the sensing window A immediately at any time, so it has an advantage in terms of latency in selecting a transmission resource but it has a disadvantage in terms of UE energy consumption. Therefore, alternatively, the UE may be implemented such that it immediately performs sensing for the sensing window A when traffic to be transmitted occurs, and after triggering to select the transmission resource occurs in slot n, performs sensing for the sensing window B to select the final transmission resource. The latter operation has an advantage of minimizing the energy consumption of the UE by performing sensing only when necessary, but it may be a disadvantage in terms of latency in selecting a transmission resource.

Hereinbefore, the method of finding an empty frequency-time resource for inter-UE communication in the sidelink and transmitting a signal in the found frequency-time resource according to various embodiments of the disclosure has been described, but the method and apparatus provided in the disclosure are not limited thereto and may be applied to various channel occupation and channel reservation methods.

Figure 15A:
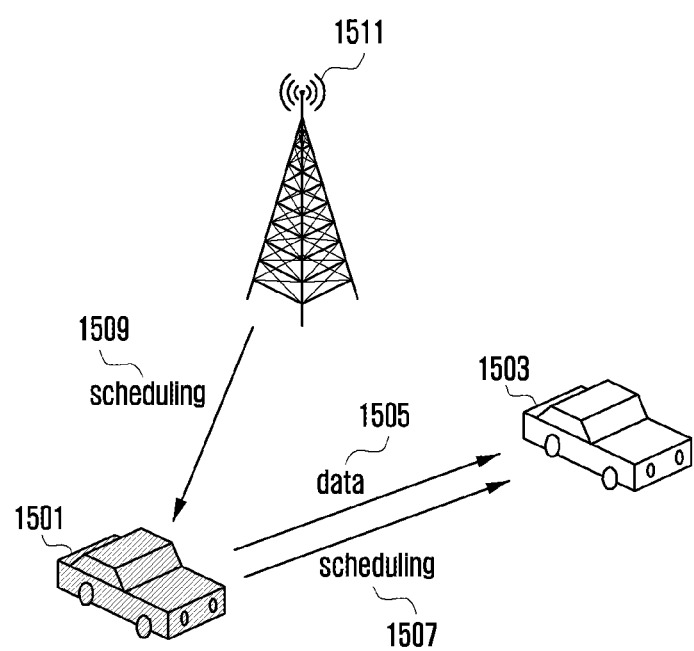
FIG. 15A is a diagram illustrating a Mode 1 method which is a method of receiving scheduling information from a base station and performing sidelink data transmission according to an embodiment of the disclosure.

FIG. 15A is a diagram illustrating a Mode 1 method which is a method of receiving scheduling information from a base station and performing sidelink data transmission according to an embodiment of the disclosure.

Specifically, FIG. 15 is a diagram illustrating the Mode 1 method of receiving scheduling information from a base station and performing sidelink data transmission as shown in FIG. 12. In the disclosure, a method in which a UE receives scheduling information from a base station and performs sidelink communication based thereon is referred to as Mode 1. A UE 1501 desiring to perform transmission in the sidelink may receive scheduling information 1509 for sidelink communication from a base station 1511. In the disclosure, the UE 1501 that intends to perform data transmission in the sidelink may be referred to as a transmitting UE, and a UE 1503 that performs data reception in the sidelink may be referred to as a receiving UE. However, each of the transmitting UE 1501 and the receiving UE 1503 may perform both data transmission and reception in the sidelink. The scheduling information 1509 for sidelink communication in Mode 1 may be obtained through downlink control information (DCI) received from the base station, and the DCI may include the following information.

Carrier indicator: It may be used for scheduling a sidelink of another carrier in a situation where carrier aggregation (CA) is applied.

Lowest index of sub-channel allocation for initial transmission: It may be used for frequency resource allocation of initial transmission.

Information to be included in sidelink control information

Frequency resource allocation information: It may include resource allocation or resource reservation information for initial transmission, retransmission, and subsequent N-th transmission.

a Time interval information between initial transmission and retransmission

Information about sidelink slot structure: It may include information about which slots and which symbols can be used for sidelink.

HARQ-ACK/CSI feedback timing information: It may include timing information for transmitting HARQ-ACK or CSI feedback in the sidelink to the base station.

Recipient ID: ID information about which UEs will receive

Quality-of-Service (QOS) information such as priority: Information about which priority data to transmit Scheduling may be used for one-time sidelink transmission or may be used in a periodic transmission, semi-persistent scheduling (SPS), or configured grant transmission method. Classification of the scheduling methods may be made by an indicator contained in the DCI or by an RNTI or ID value scrambled to the CRC added to the DCI. In Mode 1, the DCI for sidelink scheduling may add a bit having a value of 0 to have the same size as a DCI format for downlink scheduling or a DCI format for uplink scheduling in general cellular communication.

Quality of Service (QOS) may be used as an indicator to guarantee the service of sidelink of V2X. Specifically, in case of the scheduled resource allocation (mode 1) method, the base station may directly reflect the QoS information and perform the scheduling for sidelink communication. In case of the UE autonomous resource allocation (mode 2) method, the QoS may be reflected in a process of the UE performing sensing for resource allocation. In LTE V2X, the QoS is defined according to ProSe per-packet priority (PPPP), PPPP values corresponding to eight priority levels are defined, and such a value may be indicated through sidelink control information (SCI). In case of NR V2X, the QoS may be considered more important because unicast and groupcast communication between UEs as well as broadcast are considered. In particular, to support advanced service scenarios such as group driving, advanced driving, extended sensor, remote driving, etc. considered in the NR V2X, the QoS requirements need to be defined variously in more detail compared to the LTE V2X. Therefore, in the NR V2X, the PC5 5G QoS Indicator (PQI) for various QoS requirements is defined, and the PQI may include a default priority level, a packet delay budget, a packet error rate, a default maximum date burst volume, and a default averaging window. Therefore, even in the NR V2X, the base station can perform the scheduling for sidelink communication by reflecting the PQI indicator in case of the scheduled resource allocation (mode 1) method, and the UE can reflect one or more of the PQI indicators in the process of performing sensing for resource allocation in case of the UE autonomous resource allocation (mode 2) method. Specifically, the default priority level may be defined as eight priority levels similar to the PPPP of the LTE V2X. In addition, the packet delay budget may be reflected in the sensing window configuration of mode 2. Also, the packet error rate may be set to various values between $10^{-1}$ and $10^{-5}$ and may be used for transmission parameter configuration and sidelink feedback configuration according to such setting.

In case of the scheduled resource allocation (mode 1) method, as shown in FIG. 15, the transmitting UE 1501 may receive DCI for sidelink scheduling from the base station 1511. Based on this, the transmitting UE 1501 may transmit PSCCH including sidelink scheduling information 1507 to the receiving UE 1503 and transmit PSSCH, which is corresponding data 1505, to the receiving UE 1503. The sidelink scheduling information 1507 may be sidelink control information (SCI), and the SCI may include the following information.

HARQ process number: HARQ process ID for HARQ related operation of transmitted data New data indicator (NDI): Information about whether currently transmitted data is new data Redundancy version: Information about which parity bit is transmitted when mapping by performing channel coding of data Layer-1 source ID: ID information in a physical layer of a transmitting UE Layer-1 destination ID: ID information in a physical layer of a receiving UE Frequency-domain resource assignment for scheduling PSSCH: Frequency-domain resource configuration information of transmitted data MCS: Modulation order and coding rate information QoS indication: It may include a priority, a target latency/delay, a target distance, a target error rate, and the like.

Antenna port(s): Antenna port information for data transmission

DMRS sequence initialization: It may include information such as an ID value for initialization of a DMRS sequence.

PTRS-DMRS association: It may include information about PTRS mapping.

CBGTI: It may be used as an indicator for CBG unit retransmission.

Resource reservation: Information for resource reservation

Time gap between initial transmission and retransmission: Information on a time interval between initial transmission and retransmission Retransmission index: An indicator for distinguishing retransmission Transmission format/cast type indicator: An indicator for distinguishing a transmission format or unicast/groupcast/broadcast Zone ID: Location information of a transmitting UE NACK distance: A reference indicator for determining whether a receiving UE should transmit HARQ-ACK/NACK HARQ feedback indication: It may include information on whether HARQ feedback should be transmitted or whether it is being transmitted.

Time-domain resource assignment for scheduling PSSCH: Time-domain resource information of transmitted sidelink data Second SCI indication: An indicator including mapping information of the second SCI in case of two-stage control information DMRS pattern: DMRS pattern (e.g., symbol position to which DMRS is mapped) information The control information may be included in one SCI and transmitted to the receiving UE, or may be included in two SCIs and transmitted to the receiving UE. The transmission of control information divided into two SCIs may be referred to as a two-stage SCI method.

Figure 15B:
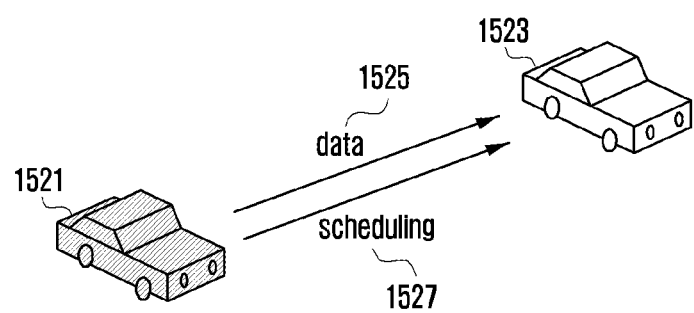
FIG. 15B is a diagram illustrating a Mode 2 method which is a method of performing sidelink data transmission without receiving scheduling information from a base station according to an embodiment of the disclosure.

FIG. 15B is a diagram illustrating a Mode 2 method which is a method of performing sidelink data transmission without receiving scheduling information from a base station according to an embodiment of the disclosure.

In the disclosure, a method in which a transmitting UE 1521 determines and performs sidelink communication without receiving scheduling information from a base station is referred to as Mode 2. The transmitting UE 1521 may transmit PSCCH including sidelink scheduling information 1527 to a receiving UE 1523 and transmit PSSCH, which is corresponding data 1525, to the receiving UE 1523. The sidelink scheduling information 1527 may include SCI, and the SCI may include information that is the same as or similar to the SCI information in Mode 1.

Figure 16A:
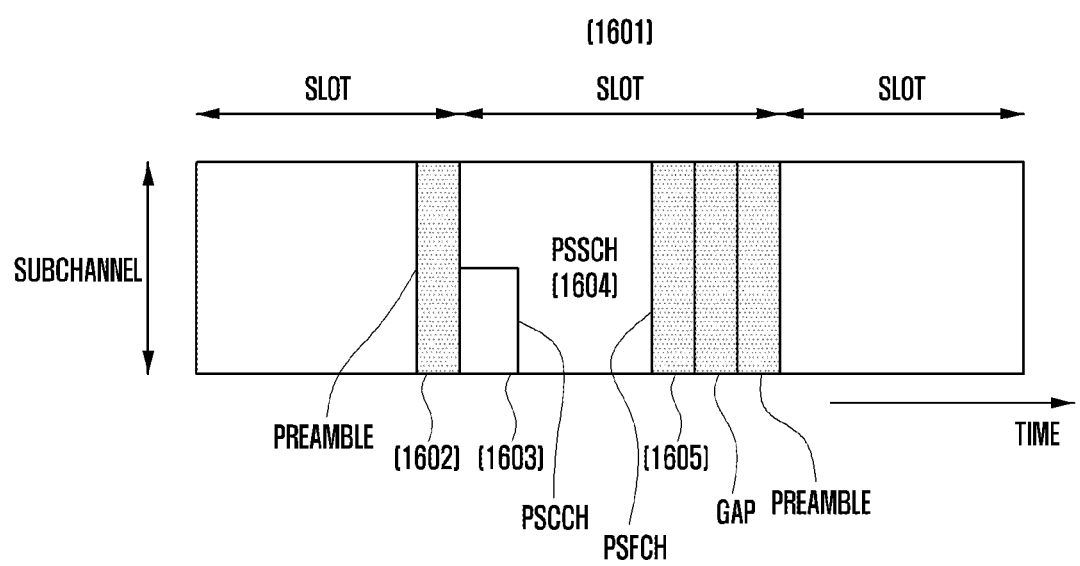
FIG. 16A is a diagram illustrating a mapping structure of physical channels mapped to one slot in a sidelink according to an embodiment of the disclosure.

FIG. 16A is a diagram illustrating a mapping structure of physical channels mapped to one slot in a sidelink according to an embodiment of the disclosure.

A transmitting UE may transmit a preamble signal 1602 in one or more symbols before transmitting a corresponding slot 1601. The preamble signal may be used so that a receiving UE can correctly perform automatic gain control (AGC) for adjusting the strength of amplification when the receiving UE amplifies the power of a received signal. Also, preamble transmission or not may be determined depending on whether the transmitting UE transmits a signal in a previous slot of the corresponding slot 1601. That is, in case that the transmitting UE transmits a signal to the same receiving UE in the previous slot of the corresponding slot 1601, the preamble transmission may be omitted. A PSCCH 1603 including control information is transmitted in initial symbols of the slot 1601, and a PSSCH 1604 scheduled by the control information of the PSCCH 1603 may be transmitted in the initial symbols of the slot 1601 or the subsequent symbols. A part of sidelink control information (SCI), which is control information, may be mapped to the PSSCH 1604 and transmitted. Also, with reference to FIG. 16A, a physical sidelink feedback channel (PSFCH) 1605, which is a physical channel for transmitting feedback information, may be located in the last part of the slot. A certain amount of empty time may be secured between the PSSCH 1604 and the PSFCH 1605 so that the UE having transmitted and received the PSSCH 1604 can prepare to transmit or receive the PSFCH 1605. After transmission/reception of the PSFCH 1605, an empty interval may be secured for a certain time.

The UE may be preconfigured with a position of a slot capable of transmitting the PSFCH 1605. The pre-configuration of the slot position may be received when the UE accesses a sidelink-related system, received from the base station when accessing the base station, or received from another UE.

Figure 16B:
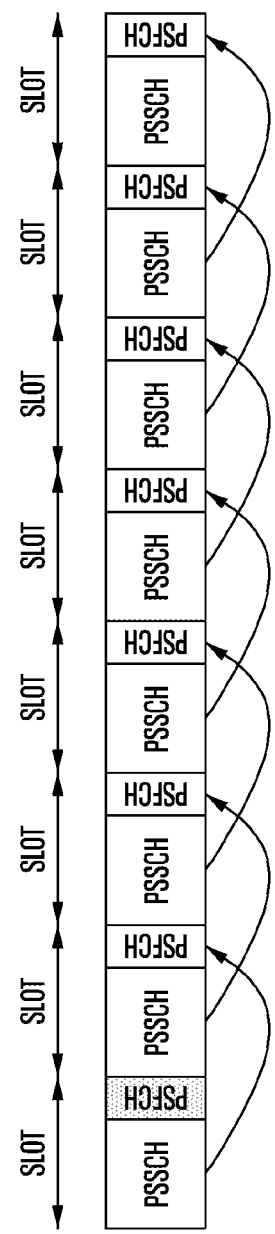
FIG. 16B is a diagram illustrating an example that resources are configured to transmit/receive a PSFCH in every slot according to an embodiment of the disclosure.

FIG. 16B is a diagram illustrating an example that resources are configured to transmit/receive a PSFCH in every slot according to an embodiment of the disclosure.

For example, when the period of a resource capable of transmitting/receiving PSFCH can be configured by a parameter such as periodicity_PSFCH_resource, FIG. 16B may correspond to a case where periodicity_PSFCH_resource is one slot. In addition, the period is configured in units of msec (milliseconds), and a resource for transmitting the PSFCH may be configured for every slot according to subcarrier spacing (SCS). With reference to FIG. 16B, feedback information on PSSCH scheduled in the n slot may be transmitted in the PSFCH of the n+1 slot.

Figure 16C:
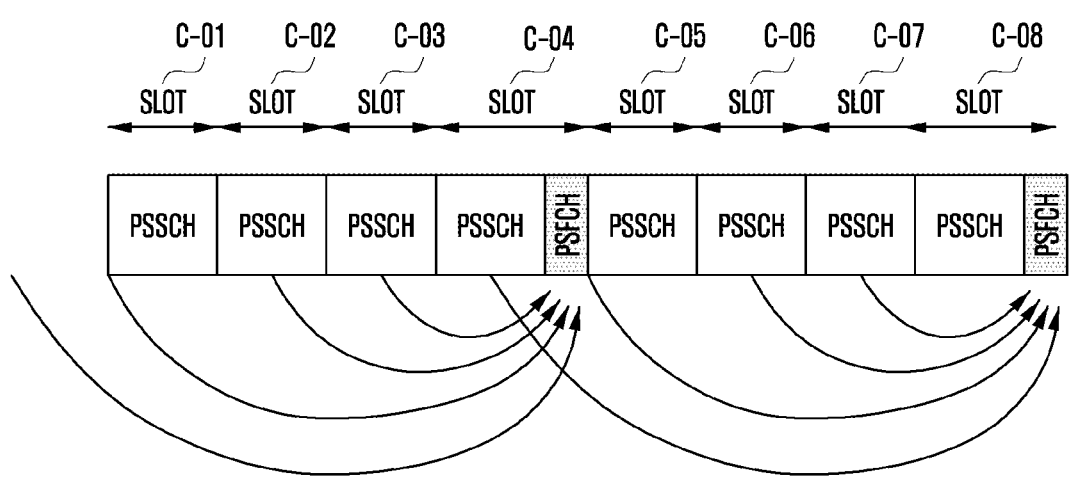
FIG. 16C is a diagram illustrating an example that resources are configured to transmit/receive a PSFCH every four slots according to an embodiment of the disclosure.

FIG. 16C is a diagram illustrating an example that resources are configured to transmit/receive a PSFCH every four slots according to an embodiment of the disclosure.

With reference to FIG. 16C, a resource may be configured to transmit/receive the PSFCH every four slots. It may be configured to transmit/receive the PSFCH only in the last slot c-04 among four slots c-01, c-02, c-03, and c-04. Similarly, it may be configured to transmit/receive the PSFCH only in the last slot c-08 among four slots c-05, c-06, c-07, and c-08. A slot index may be determined within a resource pool. That is, four slots c-01, c-02, c-03, and c-04 are not physically consecutive slots in actual and may be slots that appear continuously among slots that belong to the resource pool (or slot pool) used by a transceiver. An arrow in FIG. 16C may indicate a slot of the PSFCH in which HARQ-ACK feedback information of the PSSCH is transmitted. For example, HARQ-ACK information of the PSSCH transmitted (or scheduled) in the slots c-01, c-02, and c-03 may be transmitted/received by being included in the PSFCH transmitted in the slot c-04. Similarly, HARQ-ACK information of the PSSCH transmitted (or scheduled) in the slots c-04, c-05, c-06, and c-07 may be transmitted/received by being included in the PSFCH transmitted in the slot c-08. The reason that the HARQ-ACK feedback information of the PSSCH transmitted in the slot c-04 is not transmitted in the same slot c-04 is because there is insufficient time for the UE to finish decoding of the PSSCH transmitted in the slot c-04 and then transmit the PSFCH in the same slot c-04. That is, it may be because the minimum processing time required to process the PSSCH and prepare the PSFCH is not sufficiently small.

When transmitting and receiving the PSFCH, the UE needs to know the number of HARQ-ACK feedback bits included in the PSFCH to perform transmission and reception correctly. The number of HARQ-ACK feedback bits included in the PSFCH and which PSSCH to include HARQ-ACK bits may be determined based on one or a combination of the following parameters.

Period of a slot capable of transmitting/receiving PSFCH according to a parameter such as periodicity_PSFCH_resource Whether or not HARQ-ACK is bundling. It may be a value determined through AND operation on the HARQ-ACK bits of the PSFCH transmitted in a predetermined number of slots before transmission and reception of the PSFCH (that is, if at least one is NACK, it is judged as NACK).

The number of transport blocks (TBs) included in PSSCH

Whether code block group (CBG) unit retransmission is used and configured

Whether HARQ-ACK feedback is activated

The number of actually transmitted and received PSSCHs

Minimum processing time (K) of the UE for PSSCH processing and PSFCH transmission preparation When the UE receives the PSSCH in the slot n and a resource for transmitting the PSFCH is configured or given in the slot n+x, the UE may map information of HARQ-ACK feedback for the received PSSCH to the PSFCH of the slot n+x by using the smallest x among integers greater than or equal to K. Here, K may be a value configured in advance by the transmitting UE or a value configured in a resource pool through which the corresponding PSSCH or PSFCH is transmitted, and each UE may exchange its capability with the transmitting UE in advance for configuration of K.

The disclosure provides a method and apparatus for determining a resource and timing to transmit a signal in a sidelink. In addition, a method and apparatus for mapping data to a PSSCH in a sidelink are provided.

Figure 17:
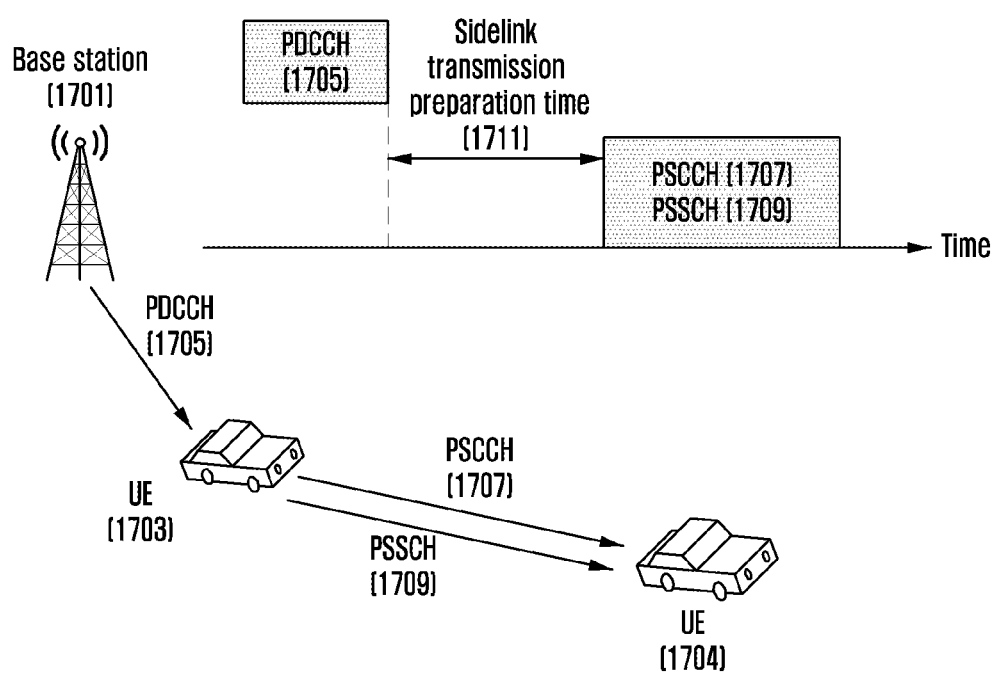
FIG. 17 is a diagram illustrating a timing for receiving scheduling information from a base station and transmitting a sidelink signal according to an embodiment of the disclosure.

FIG. 17 is a diagram illustrating a timing for receiving scheduling information from a base station and transmitting a sidelink signal according to an embodiment of the disclosure.

A base station 1701 may transmit configuration information and DCI to a UE 1703 to provide scheduling information for sidelink data transmission. At this time, the base station 1701 may transmit the DCI via a PDCCH 1705, and the UE may decode the PDCCH 1705 to identify scheduling DCI information. The UE 1703 may identify a resource for sidelink transmission based on the scheduling DCI information received from the base station and thus transmit a PSCCH 1707 and a PSSCH 1709, which are a control signal and a data signal in the sidelink, to other UE 1704 or a plurality of other UEs. After receiving the PDCCH 1705, the UE 1703 may require a preparation time of a predetermined time or longer before transmitting the PSCCH 1707 and the PSSCH 1709. The preparation time may include a time for decoding the received PDCCH 1705, a time for preparing control information and data to be transmitted according to the DCI scheduling information, and a time for mapping the prepared control information and data to the PSCCH 1707 and the PSSCH 1709, respectively. Considering a sidelink transmission preparation time 1711, the PSCCH 1707 and the PSSCH 1709 may be transmitted after a point of time according to Equation A below.

$$T_{DL} - T^{TA} + T_{proc}$$ [Equation A]

TDL is the point of time at which the scheduling PDCCH 1705 is transmitted in downlink, and it may be the point of time indicating the last part of the last symbol of the PDCCH 1705. TTA may be a value calculated based on applying timing advance (TA) of the UE. TTA may be determined as the time for performing the TA or half of that time, but embodiments of the disclosure is not limited thereto. Tproc may be the minimum time it takes for the UE 1703 receiving the PDCCH 1705 to transmit the PSCCH 1707 and the PSSCH 1709, and it may be determined as 4 msec in case of performing LTE sidelink transmission by receiving scheduling from the LTE base station (eNB). It may be determined as 4 msec even in case of performing NR sidelink transmission by receiving scheduling from the LTE base station (eNB). In case of performing LTE sidelink transmission by receiving scheduling from the NR base station (gNB), it may be determined as 3 msec. In case of performing NR sidelink transmission by receiving scheduling from the NR base station (gNB), it may be determined as 2 msec. The above-described time is an example, and the disclosure may be applied without being limited thereto. In addition, in case of performing LTE or NR sidelink transmission by receiving scheduling from the NR base station (gNB), Tproc may be given in a symbol unit, for example, as follows, depending on the subcarrier spacing of the PDCCH 1705 received from the gNB. That is, depending on the subcarrier spacing of 15 kHz, 30 kHz, 60 kHz, or 120 kHz, u may be given as 0, 1, 2, or 3.

TABLE A

| $\mu$ | $T_{proc}$ (Symbol) |
|---|---|
| 0 | 8 |
| 1 | 10 |
| 2 | 17 |
| 3 | 20 |

According to another example, other $T_{proc}$ values may be applied depending on UE capability. Basically, the UE can determine $T_{proc}$ by assuming the value given in Table A, but if the UE reports faster processing capability to the base station, the value given in Table B below may be applied.

TABLE B

| $\mu$ | $T_{proc}$ (Symbol) |
|---|---|
| 0 | 3 |
| 1 | 4.5 |
| 2 | 9 |
| 3 | 11 |

For this, the UE may transmit UE capability information on its own processing capability to the base station through higher signaling.

When the UE 1703 selects a resource for sidelink transmission, resources before the time point calculated by Equation A may be excluded from the resource selection process so that such resources are not selected as resources for sidelink transmission. In Table A and Table B, the value of Tproc is given in symbol units, so the unit may be changed to msec or sec units when applying it to Equation A.

Meanwhile, the base station 1701 may indicate to the UE 1703 which slot (i.e., timing information) should be used for transmitting the PSCCH 1707 and the PSSCH 1709 in the sidelink. Transmission timing information of the PSCCH 1707 and the PSSCH 1709 may be determined based on a combination of higher signaling and a DCI bit field indicator. In addition, sidelink timing information may be given to transmit in the first sidelink transmittable slot that appears after the time point calculated from Equation B.

$$T_{DL} - T^{TA} + T_{indicated} \quad \text{[Equation B]}$$

Tindicated may be a value determined based on a DCI bit field indicator and/or higher signaling from the base station, and TDL and TTA may have the same meaning as used in Equation A. Tindicated may be a value determined according to the configured grant transmission setting.

Equation A or Equation B may be replaced with the following Equation C.

$$T_{DL} - \frac{N_{TA}}{2} \times T_S + (4+m) \times 10^{-3} \quad \text{[Equation C]}$$

In Equation C, the value of m may be a value indicated in one or several bit fields of DCI, a preconfigured value, or a value determined according to UE capability. In Equation C, NTA may be a value indicated by the base station for timing advance, and TS may be given as TS=1/(15000×2048) seconds.

The sidelink transmission may be performed in the first slot capable of sidelink transmission in the corresponding resource pool after the preparation time determined according to Equation A, Equation B, or Equation C from the point of time when the UE receives the PDCCH.

Figure 18:
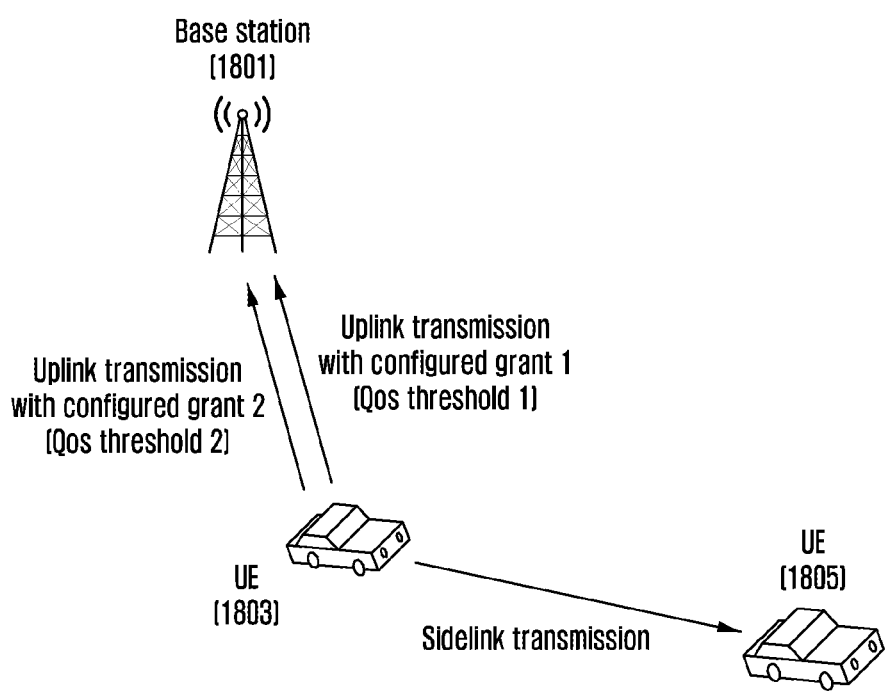
FIG. 18 is a diagram illustrating a method for a UE to determine uplink and sidelink signal transmission according to an embodiment of the disclosure.

FIG. 18 is a diagram illustrating a method for a UE to determine uplink and sidelink signal transmission according to an embodiment of the disclosure.

Specifically, with reference to FIG. 18, a UE 1803 may determine uplink and sidelink transmission to perform uplink transmission to a base station 1801 and perform sidelink transmission to another UE 1805.

The base station 1801 may configure one or more configured uplink (configured grant; CG) resources to the UE 1803. The uplink (CG) resource configuration may be to configure a resource so that the UE 1803 can perform uplink data transmission without a separate scheduling DCI. Although there is no separate scheduling DCI, DCI for activation/deactivation of configured CG uplink transmission may be transmitted to the UE. The CG uplink transmission may be referred to as semi-persistent scheduling (SPS) uplink transmission. The base station 1801 may give a plurality of configurations for CG uplink transmission to the UE 1803. That is, scheduling information for uplink CG transmission may be given to the UE with the first CG configuration, the second CG configuration, . . . , the N-th CG configuration, and each CG configuration may include a time and period available for uplink transmission, frequency resource allocation information, and the like. Therefore, the UE 1803 may perform uplink data transmission, that is, PUSCH transmission, in a resource corresponding to each CG configuration. When the UE 1803 performing sidelink transmission/reception receives an uplink CG configuration, the base station 1801 may configure a QoS threshold for each CG configuration. This QoS threshold may be used to determine which of sidelink transmission or uplink transmission is to be performed when the sidelink transmission and the uplink transmission are scheduled or determined to be transmitted in the same slot or at the same time. That is, by comparing the QoS threshold configured for CG uplink transmission with the QoS determined for sidelink transmission, it may transmit the one having a higher priority and may not transmit the rest. Alternatively, by comparing the QoS threshold configured for CG uplink transmission with the QoS determined for sidelink transmission, it may allocate transmission power first to the one having a higher priority and allocate the remaining power to the remaining transmission. The high priority may mean that a priority value, which is a QoS parameter, is low. The QoS threshold configured for CG uplink transmission may be assigned by the base station 1801 for each uplink CG configuration depending on the purpose of the uplink CG configuration. Depending on priority determination with sidelink transmission, CGs with different uses and purposes may be determined differently.

Figure 19:
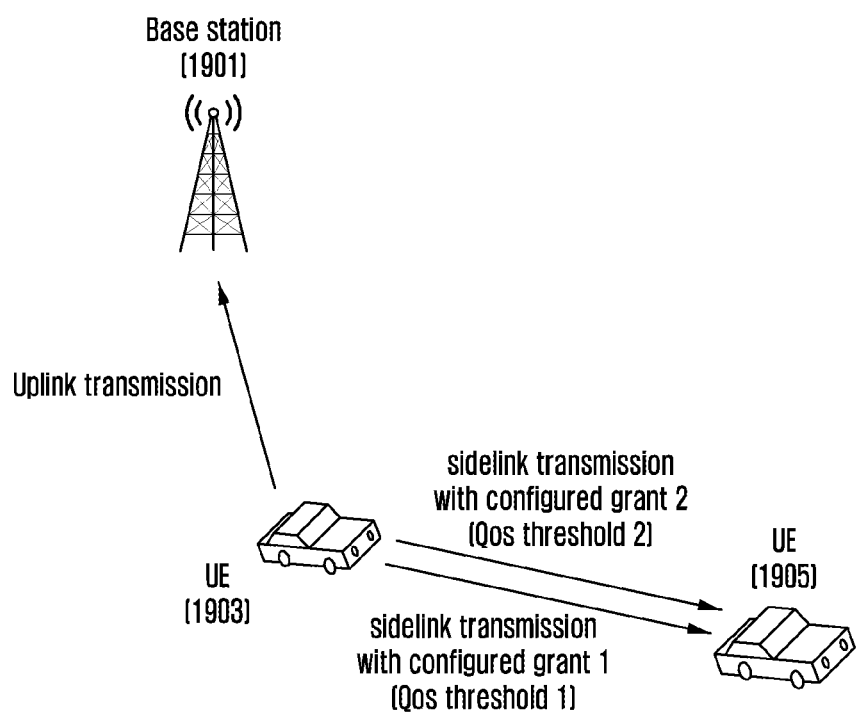
FIG. 19 is a diagram illustrating another method for a UE to determine uplink and sidelink signal transmission according to an embodiment of the disclosure.

FIG. 19 is a diagram illustrating another method for a UE to determine uplink and sidelink signal transmission according to an embodiment of the disclosure.

Specifically, with reference to FIG. 19, a UE 1903 may determine uplink and sidelink transmission to perform uplink transmission to a base station 1901 and perform sidelink transmission to another UE 1905. In FIG. 19, one or more CG configurations for sidelink transmission may be received from the base station 1901 for sidelink transmission.

The base station 1901 may configure a resource for one or more CG sidelink transmissions to the UE 1903. This may be that the base station 1901 configures a sidelink resource to the UE 1903 so that the UE 1903 can perform sidelink data transmission without DCI for separate sidelink scheduling. With reference to FIG. 19, although there is no separate scheduling DCI, DCI for activation/deactivation of configured CG sidelink transmission may be transmitted to the UE. The CG sidelink transmission may be referred to as semi-persistent scheduling (SPS) sidelink transmission. The base station 1901 may give a plurality of configurations for CG sidelink transmission to the UE 1903. That is, scheduling information for sidelink CG transmission may be given to the UE 1903 with the first CG configuration, the second CG configuration, . . . , the N-th CG configuration, and each CG configuration may include a time and period available for sidelink transmission, sidelink resource pool information, frequency resource allocation information, and the like. Therefore, the UE 1903 may perform sidelink data transmission, that is, PSSCH transmission, in a resource corresponding to each CG configuration. When the UE 1903 performing sidelink transmission/reception receives a sidelink CG configuration, the base station 1901 may configure a QoS threshold for each CG configuration. This QoS threshold may be used to determine which of sidelink transmission or uplink transmission is to be performed when the sidelink transmission and the uplink transmission are scheduled or determined to be transmitted in the same slot or at the same time. That is, by comparing the QoS threshold configured for CG sidelink transmission with the QoS determined for uplink transmission, it may perform sidelink transmission and may not perform uplink transmission if the sidelink priority is high. Alternatively, by comparing the QoS threshold configured for CG sidelink transmission with the QoS determined for uplink transmission, it may allocate transmission power first to the sidelink transmission and allocate the remaining power to the uplink transmission if the sidelink priority is high. The high priority may mean that a priority value, which is a QoS parameter, is low. The QoS threshold configured for CG sidelink transmission may be assigned by the base station 1701 for each sidelink CG configuration depending on the purpose of the sidelink CG configuration. Depending on priority determination with uplink transmission, CGs with different uses and purposes may be determined differently.

Regardless of the uplink transmission of the UE 1903, when the UE 1903 receives the sidelink CG configuration for sidelink transmission from the base station 1901, the sidelink CG transmission configuration may also include QoS threshold information. If the QoS threshold information is included in the received sidelink CG configuration, the corresponding UE 1903 can transmit data in a resource given by the corresponding sidelink CG configuration only when the QoS value of the data to be transmitted in the sidelink transmission has a higher priority than the QoS threshold. The high priority may mean that a priority value, which is a QoS parameter, is low.

Figure 20:
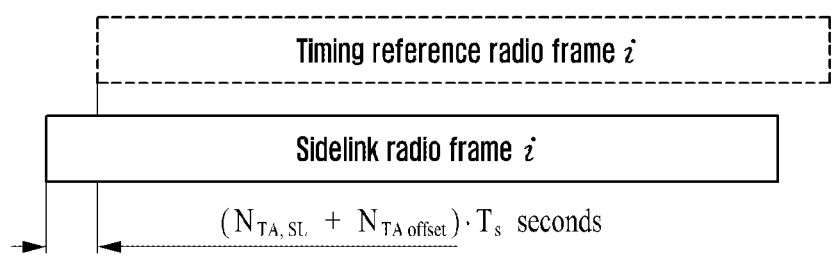
FIG. 20 is a diagram illustrating a method for a UE to apply a timing advance while performing a sidelink operation according to an embodiment of the disclosure.

FIG. 20 is a diagram illustrating a method for a UE to apply a timing advance while performing a sidelink operation according to an embodiment of the disclosure.

Specifically, FIG. 20 shows an example of applying the timing advance (TA) for advancing a transmission timing from a reference timing for sidelink transmission. That is, as shown in FIG. 20, the UE may transmit a sidelink signal ahead of the reference timing by $(N_{TA,SL}+N_{TA,offset})\times T_s$ seconds. $N_{TA,SL}$ is one parameter for calculating the TA value applied in the sidelink. $N_{TA,offset}$ may be another parameter for calculating the TA value. $T_s$ may be given as $T_s=1/(15000\times 2048)$ seconds. $N_{TA,offset}$ may be a value predetermined as 0, 624, or the like. $N_{TA,SL}$ may be determined by one or a combination of the following methods.

Method 1: $N_{TA,SL}$ may be configured according to a resource pool in which the UE operates. That is, when the resource pool is configured from the base station or pre-configured, the $N_{TA,SL}$ may also be configured. This may be to minimize interference while transmitting and receiving UEs are predetermined in one resource pool and such UEs perform sidelink transmission/reception.

Method 2: The configured $N_{TA,SL}$ may not always be a fixed value and may be configured/indicated differently from the base station or be a value configured/indicated for a unicast or groupcast sidelink operation from another UE through PC5-RRC or MAC CE of the sidelink. When configured/indicated from the base station or another UE, the $N_{TA,SL}$ value itself may be configured/indicated. Alternatively, a variation value of $N_{TA,SL}$ may be configured/indicated. In this case, it may be to configure/indicate a value to be added to or subtracted from the previously applied $N_{TA,SL}$ value.

Method 3: $N_{TA,SL}$ may be applied differently depending on a frequency in which sidelink signal transmission is performed. For example, when performing sidelink transmission/reception in an uplink frequency, the UE may assume that the TA in case of performing sidelink transmission is the same value as the TA configured for the uplink, and apply it. In this case, the UE may equally apply the uplink TA indicated by the base station for the sidelink, or the base station may indicate the sidelink TA value as the same value as the uplink TA value.

As described above in FIG. 4C, the UEs (UE-A, UE-B) may exchange configuration information with each other through higher signaling such as PC5-RRC signaling after the connection procedure in the sidelink. The two UEs (UE-A, UE-B) may be able to exchange one or more of the following parameters with each other through PC5-RRC or a control element (CE) of a sidelink MAC layer thereunder.

Resource pool configuration for unicast or groupcast control and data signal transmission/reception Scheduling information for unicast or groupcast signal transmission, which may be configuration information for sidelink CG transmission.

A signal that transmits configuration information from the base station

The resource pool for unicast or groupcast control and data signal transmission and reception may be different from the resource pool for sidelink broadcast and may have configuration information different from the resource pool through which PC5-RRC signaling is transmitted.

Figure 21:
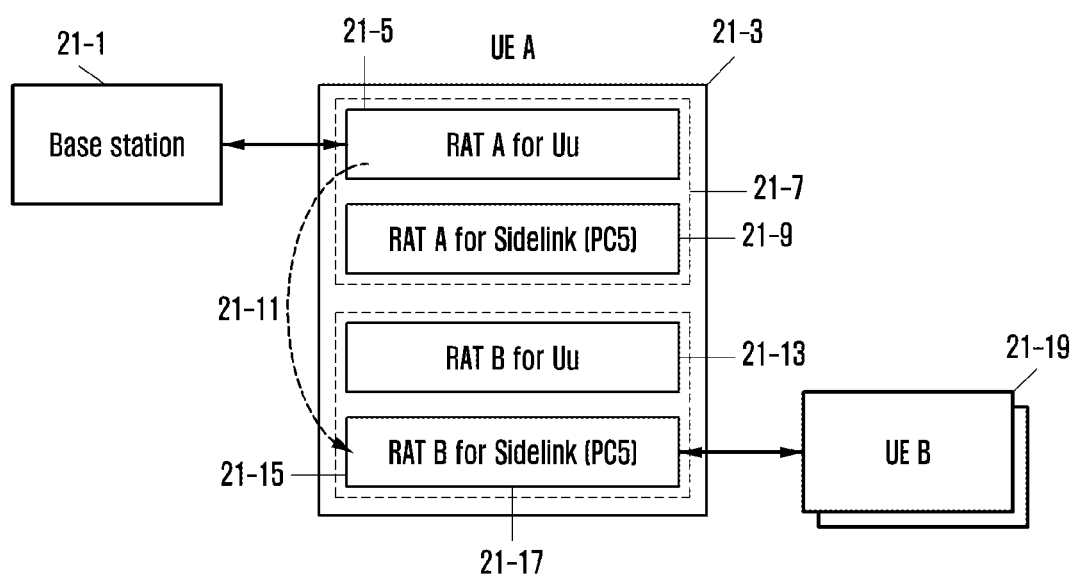
FIG. 21 is a diagram illustrating a situation of receiving scheduling information from a base station and transmitting a sidelink signal according to an embodiment of the disclosure.

FIG. 21 is a diagram illustrating a situation of receiving scheduling information from a base station and transmitting a sidelink signal according to an embodiment of the disclosure.

FIG. 21 corresponds to a resource allocation (mode 1) method in which the base station directly participates in resource allocation as described above in FIGS. 12, 15A, and 17. That is, a method and apparatus for determining a sidelink transmission timing when receiving scheduling information from the base station and performing sidelink transmission/reception are provided. Specifically, a situation where the radio access technology (RAT) of the uplink/downlink between a base station 21-1 and a UE A 21-3 is different from the RAT of the sidelink between the UE A 21-3 and a UE B 21-19 is additionally considered. For example, it may be applied to a case in which NR sidelink transmission is performed by receiving scheduling from an LTE base station (eNB), or a case in which LTE sidelink transmission is performed by receiving scheduling from an NR base station (gNB). Of course, it may also be applied to a case in which LTE sidelink transmission is performed by receiving scheduling from the LTE base station (eNB), or a case in which NR sidelink transmission is performed by receiving scheduling from the NR base station (gNB).

The base station 21-1 may transmit configuration information and DCI to the UE A 21-3 to provide scheduling information for sidelink data transmission. At this time, the base station may transmit the DCI via a PDCCH, and the UE may decode the PDCCH to identify scheduling DCI information. The UE A 21-3 may identify a resource for sidelink transmission from the scheduling DCI information and thus transmit a PSCCH and a PSSCH, which are a control signal and a data signal in the sidelink, to other UE 21-19 or a plurality of other UEs 21-19. After receiving the PDCCH, the UE may require a preparation time of a predetermined time or longer before transmitting the PSCCH and the PSSCH. The preparation time may include a time for decoding the received PDCCH, a time for preparing control information and data to be transmitted according to the DCI scheduling information, and a time for mapping the prepared control information and data to the PSCCH and the PSSCH, respectively. If the first symbol of the PSCCH and/or PSSCH exists after a value derived from Equation 21-A below after receiving the last symbol of the PDCCH including the DCI for scheduling the PSCCH and/or PSSCH, the UE transmits the PSCCH and/or PSSCH. If the first symbol of the PSCCH and/or PSSCH exists before a value derived from Equation 21-A below after receiving the last symbol of the PDCCH including the DCI for scheduling the PSCCH and/or PSSCH, the UE may ignore the DCI. Ignoring the DCI may mean that the UE regards the received DCI as an error case and does not perform transmission of the PSCCH and/or PSSCH scheduled via the DCI.

$$T_{proc,s} = \{(N_s + d_1 + d_2 + d_3 + d_4)(2048 + 144) \cdot \kappa 2^{-\mu}\} \cdot T_c \quad \text{[Equation 21-A]}$$

As Ns in Equation 21-A, a value shown in Table 21-A or Table 21-B may be used depending on the subcarrier spacing. The symbols defined in Table 21-A or Table 21-B are only examples, and it may be sufficiently possible to use other values.

TABLE 21-A

| μ | PSSCH/PSSCH preparation time $N_S$ [symbols] |
|---|---|
| 0 (15 kHz) | 10 |
| 1 (30 kHz) | 12 |
| 2 (60 kHz) | 23 |
| 3 (120 kHz) | 36 |

According to another example, other Ns values may be applied depending on UE capability. Basically, the UE can determine Ns by assuming the value defined in Table 21-A, but if the UE reports faster processing capability to the base station, the value given in Table 21-B below may be applied.

TABLE 21-B

| μ | PSSCH/PSSCH preparation time $N_S$ [symbols] |
|---|---|
| 0 (15 kHz) | 5 |
| 1 (30 kHz) | 5.5 |
| 2 (60 kHz) | 11 |
| 3 (120 kHz) | 15 |

For this, the UE may transmit UE capability information on its own processing capability to the base station through higher signaling. When the UE selects a resource for sidelink transmission, resources before the time point calculated by Equation 21-A may be excluded from the resource selection process so that such resources are not selected as resources for sidelink transmission. In Table 21-A and Table 21-B, the value of Ns is given in symbol units, so the unit may be changed to msec or sec units when applying Ns to Equation 21-A.

In Equation 21-A, if the PSSCH is also present in the first symbol to which the PSCCH is allocated, the d1 value may be 1 (or another natural number value), and if the PSSCH is not present in the first symbol to which the PSCCH is allocated, the d1 value may be zero. If the first symbol of the slot in which the PSCCH is transmitted consists of a sequence for AGC, the d2 value may be 0, otherwise, the d2 value may be 1.

In case that the radio access technology (RAT) of the uplink/downlink between the base station 21-1 and the UE A 21-3 is different from the RAT of the sidelink between the UE A 21-3 and the UE B 21-19, a processing time delay may further occur depending on the UE implementation when information is transferred between different RATs. FIG. 21 shows a situation where the UE A 21-3 has two RATs for transmission/reception of control/data information in each of Uu and sidelink. When the UE A 21-3 performs transmission/reception of Uu control/data information with the base station 21-1 through RAT A and performs transmission/reception of sidelink control/data information with the other UE 21-19 through RAT B, a processing time delay for information transfer from the RAT A for Uu to the RAT B for sidelink or for a change 21-11 in transmitting/receiving units may additionally occur. The RAT A and the RAT B may be the same RAT or different RATs, and LTE and NR may be an example thereof. Although FIG. 21 shows the UE A 21-3 as having all of components 21-5, 21-9, 21-13, and 21-15, any UE having only some of them may be sufficiently applied. Reference numeral 21-5 denotes a processor or information processing unit for RAT A Uu, reference numeral 21-9 denotes a processor or information processing unit for RAT A sidelink, reference numeral 21-13 denotes a processor or information processing unit for RAT B Uu, and reference numeral 21-15 denotes a processor or information processing unit for the RAT B side link. Depending on the UE implementation, components 21-5 and 21-9 may be implemented as one processor or information processing unit 21-7 or may exist separately. Similarly, components 21-13 and 21-15 may be implemented as one processor or information processing unit 21-17 or may exist separately. Therefore, in a situation where the RAT A and the RAT B are different, d3 may become A, where the A value is a natural number, which may be a capability value previously reported by the UE to the base station, a value configured by the base station to the UE, or a specific value defined in the standard. If there is no capability report or configuration for the corresponding value, the UE A 21-03 may regard d3 as 0.

If SCI-related information is additionally included in the PSSCH, d4 may be 1 (or other natural number value), and if not included, d4 may be 0.

It may be possible to be described in the standard as in the following Table 21-C.

TABLE 21-C

If the first sidelink symbol in the PSCCH and PSSCH (if provided), as defined by the slot offset $K_s$ of the scheduling DCL is no earlier than at symbol $L_s$, where $L_s$, is defined as the next available sidelink symbol with its CP starting [Equation 21-A]

$$T_{proc, s} = \{\{N_s + d_1 + d_2 + d_3 + d_4\}(2048 + 144) \cdot \kappa 2^{-\mu}\} \cdot T_C$$

after the end of the reception of the last symbol of the PDCCH carrying the DCI scheduling PSCCH, then the UE shall transmit the PSCCH and PSSCH (if provided).

- $N_2$ is based on μ of Table A and Table B for UE processing capability 1 and 2 respectively, where μ corresponds to the one of ($μ_{DL}$, $μ_{SL}$) resulting with the largest $T_{proc, s}$ where the $μ_{DL}$ corresponds to the subcarrier spacing of the downlink with which the PDCCH carrying the DCI scheduling the PSCCH was transmitted and $μ_{SL}$ corresponds to the subcarrier spacing of the sidelink channel with which the PSCCH is to be transmitted, and κ is defined in subclause 4.1 of [4, TS 38.211].

TABLE 21-C-continued

- Condition 1: If the first symbol of the PSCCH allocation includes PSSCH scheduled by the PSCCH, $d_1 = 1$, otherwise, $d_1 = 0$.
- Condition 2: If the first symbol of the slot for PSCCH transmission consists of sequence only used for AGC, $d_2 = 0$, otherwise, $d_2 = 1$.
- Condition 3: $d_3 = \Delta$ and $\Delta$ is given by a value of configurations based on UE capability signalling for scheduling LTE sidelink by gNB. If the configuration is not provided, UE assumes $d_3 = 0$.
- Condition 4: If PSSCH includes $2^{nd}$ SCI, $d_4 = 1$, otherwise, $d_4 = 0$.

Otherwise the UE may ignore the scheduling DCI.

One of the following conditions may be applied instead Condition 1 in Table 21-C.
- If the first symbol of the PSCCH is allocated only for PSCCH transmission, $d_1=0$, otherwise, $d_1=1$
- If the first symbol of the PSCCH is allocated for PSCCH transmission and corresponding PSSCH transmission, $d_1=1$, otherwise, $d_1=0$.

One of the following conditions may be applied instead of Condition 2 in Table 21-C.
- If the first symbol of the slot for PSCCH transmission consists of PSCCH and/or PSSCH only, $d_2=1$, otherwise, $d_2=0$.

One of the following conditions may be applied instead of Condition 4 in Table 21-C.

If allocated number of RBs or sub-channels for PSCCH and PSSCH is larger than 10, $d_4=1$ otherwise, $d_4=0$.

Numerical values described in the above conditions may be substituted for other values.

Alternatively, it may be possible to be described in the standard as in Table 21-D.

TABLE 21-D

UE does not expect to receive DCI format indicating PSCCH resource if the PDCCH reception that includes the DCI format is not earlier than [Equation 21-A] from the beginning of a first symbol of PSCCH transmission in the slot that is indicated by a slot offset value included in DCI format where μ corresponds to the smallest SCS configuration between the SCS configuration of the PDCCH providing the DCI format and the SCS configuration of the PSCCH. If the first symbol of the PSCCH allocation includes PSSCH scheduled by the PSCCH, $d_1 = 0$. otherwise, $d_1 = 0$. If the first symbol of the slot for PSCCH transmission consists of sequence only used for AGC, $d_2 = 0$, otherwise, $d_2$ as 1. $d_3 = \Delta$ and $\Delta$ is given by a value of configurations based on UE capability signalling when a UE is scheduled to LTE sidelink via NR gNB. If the configuration is not provided, UE assumes $d_3 = 0$. If PSSCH includes $2^{nd}$ SCI, $d_4 = 1$, otherwise. $d_4 = 0$.

Alternatively, it may be possible to be described in the standard as in Table 21-E.

TABLE 21-E

UE is expected to provide PSCCH resource starting from a valid sidelink symbol after [Equation 21-A] from the last symbol of a PDCCH reception that includes the DCI format indicating PSCCH resource where μ corresponds to the smallest SCS configuration between the SCS configuration of the PDCCH providing the DCI format and the SCS configuration of the PSCCH. If the first symbol of the PSCCH allocation includes PSSCH scheduled by the PSCCH, $d_1 = 0$, otherwise, $d_1 = 0$. If the first symbol of the slot for PSCCH transmission consists of sequence only used for AGC, $d_2 = 0$. otherwise, $d_2 = 1$. $d_3 = \Delta$ and $\Delta$ is given by a value of configurations based on UE capability signalling when a UE is scheduled to LTE sidelink via NR gNB. If the configuration is not provided, UE assumes $d_3 = 0$. If PSSCH includes $2^{nd}$ SCI, $d_4 = 1$, otherwise, $d_4 = 0$.

Alternatively, it may be possible to be described in the standard as in Table 21-F.

TABLE 21-F

For a UE is operated with NR sidelink transmission via LTE Uu, if the UE receives in subframe n DCI format X with the CRC scrambled by SL-V-RNTI, one transmission of PSCCH for NR sidelink is in the PSCCH resource $L_{init}$ in the first subframe that is included in $(\ldots, \ldots)$ and that starts not earlier than $T_{DL} - \dfrac{N_{TA}}{2} \times T_S + (4+m) \times 10^{-3} + d_5$ is the value indicated by "lowest index of the sub-channel allocation to the initial transmission" associated with the configured sidelink grant, $(t_0{}^{SL}, t_1{}^{SL}, t_2{}^{SL}, \ldots)$ is determined by 3GPP TS 36.213's Subclause 14.1.5, the value m is indicated by 'SL index' field in the corresponding DCI format 5A according to 3GPP TS 36.213's Table 14.2.1-1 if this field is present and $m = 0$ otherwise, $T_{DL}$ is the start of the downlink subframe carrying the DCI, and $N_{TA}$ and $T_S$ are described in 3GPP TS 36.211, where $d_5 = \Delta$ and $\Delta$ is given by a value of configurations based on UE capability signalling. If the configuration is not provided, UE assumes $d_5 = 0$.

The aforementioned Equation 21-A may be replaced with Equation 21-B, Equation 21-C, Equation 21-D, Equation 21-E, or Equation 21-F given below.

$$T_{proc,s} = \left\{(N_s + d_1 + d_2 + d_3 + d_4)(2048 + 144) \cdot K2^{-\mu} - \frac{N_{TA}}{2}\right\} \cdot T_C \quad \text{[Equation 21-B]}$$

$$T_{proc,s} = \{(N_s + d_1 + d_2 + d_3 + d_4)(2048 + 144) \cdot K2^{-\mu}\} \cdot T_C - \frac{T_{TA}}{2} \quad \text{[Equation 21-C]}$$

$$T_{proc,s} = \left\{\left((N_s + d_1 + d_2 + d_3 + d_4)(2048 + 144) - \frac{N_{TA}}{2}\right) \cdot K2^{-\mu}\right\} \cdot T_C \quad \text{[Equation 21-D]}$$

$$T_{proc,s} = \left\{(N_s + d_1 + d_2 + d_3 + d_4)(2048 + 144) \cdot K2^{-\mu} - \frac{N_{TA,offset}}{2}\right\} \cdot T_C \quad \text{[Equation 21-E]}$$

$$T_{proc,s} = \left\{\left((N_s + d_1 + d_2 + d_3 + d_4)(2048 + 144) - \frac{N_{TA,offset}}{2}\right) \cdot K2^{-\mu}\right\} \cdot T_C \quad \text{[Equation 21-F]}$$

In the above Equations, the values of NTA, offset, k, μ, NTA, and TTA have the meanings and values defined in Section 4.1 of the 3GPP standard TS 38.211. Alternatively, in the above Equations, the values of $N_{TA,offset}$, k, μ, NTA, and TTA have the meanings and values defined in section 4 of the 3GPP standard TS 36.211. In Equations 21-A, B, C, D, E, and F, some or all of d1, d2, d3, and d4 may not exist depending on base station higher signaling configuration, UE capability report, or standard definition. If some parameters are not included in the above Equations 21-A, B, C, D, E, and F, the UE may not consider the conditions previously described in relation to each parameter.

Figure 22:
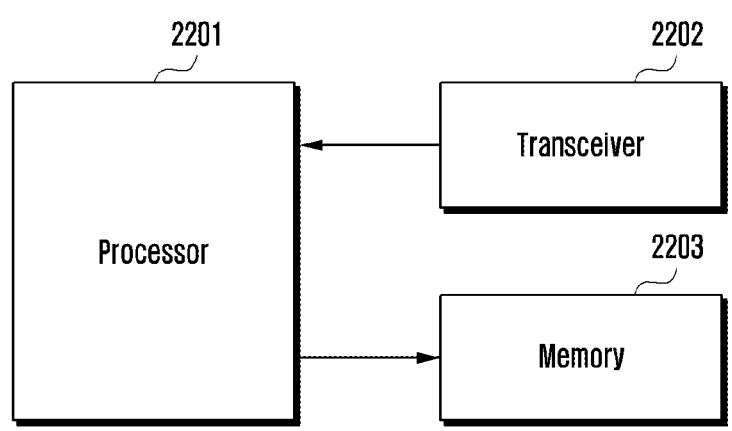
FIG. 22 is a diagram illustrating an internal structure of a UE according to embodiments of the disclosure.
Figure 23:
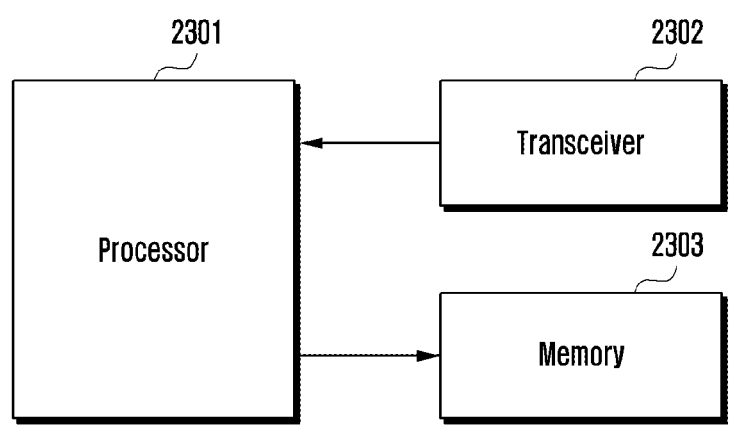
FIG. 23 is a diagram illustrating an internal structure of a base station according to embodiments of the disclosure.

A transmitter, a receiver, and a processor of the UE and the base station are shown in FIGS. 22 and 23 in order to perform embodiments of the disclosure.

FIG. 22 is a diagram illustrating an internal structure of a UE according to embodiments of the disclosure. Specifically, as shown in FIG. 22, the UE of the disclosure may include a transceiver 2202, a memory 2203, and a processor 2201. In accordance with the communication method of the UE described above, the transceiver 2202, the memory 2203, and the processor 2201 of the UE may operate. The components of the UE are not limited to the above-described examples. For example, the UE may include more or fewer components than the aforementioned components. In addition, the transceiver 2202, the memory 2203, and the processor 2201 may be implemented in the form of a single chip.

The transceiver 2202 may transmit/receive a signal to/from the base station. Here, the signal may include control information and data. To this end, the transceiver 2202 may include an RF transmitter for up-converting and amplifying the frequency of a signal to be transmitted, and an RF receiver for low-noise amplifying and down-converting a received signal. However, this is only an embodiment of the transceiver 2202, and the components of the transceiver 2202 are not limited to the RF transmitter and the RF receiver. In addition, the transceiver 2202 may receive a signal through a wireless channel and output it to the processor 2201, and transmit a signal outputted from the processor 2201 through a wireless channel. The processor 2201 may control a series of processes so that the UE can operate in accordance with the above-described embodiments of the disclosure. For example, the transceiver 2202 may receive control information from the base station in downlink, and the processor 2201 may determine whether and how to transmit sidelink according to the control information and configuration information and accordingly perform transmission preparation. Thereafter, the transceiver 2202 may transmit the scheduled feedback to the base station.

FIG. 23 is a diagram illustrating an internal structure of a base station according to embodiments of the disclosure. Specifically, as shown in FIG. 23, the base station of the disclosure may include a transceiver 2302, a memory 2303, and a processor 2301. In accordance with the communication method of the base station described above, the transceiver 2302, the memory 2303, and the processor 2301 of the base station may operate. The components of the base station are not limited to the above-described examples. For example, the base station may include more or fewer components than the aforementioned components. In addition, the transceiver 2302, the memory 2303, and the processor 2301 may be implemented in the form of a single chip.

The transceiver 2302 may transmit/receive a signal to/from the UE. Here, the signal may include control information and data. To this end, the transceiver 2302 may include an RF transmitter for up-converting and amplifying the frequency of a signal to be transmitted, and an RF receiver for low-noise amplifying and down-converting a received signal. However, this is only an embodiment of the transceiver 2302, and the components of the transceiver 2302 are not limited to the RF transmitter and the RF receiver.

In addition, the transceiver 2302 may receive a signal through a wireless channel and output it to the processor 2301, and transmit a signal outputted from the processor 2301 through a wireless channel.

The memory 2303 may store programs and data necessary for the operation of the base station. In addition, the memory 2303 may store control information or data included in a signal obtained from the base station. The memory 2303 may be implemented as a storage medium or a combination of storage media such as ROM, RAM, hard disk, CD-ROM, and DVD.

The processor 2301 may control a series of processes so that the base station can operate in accordance with the above-described embodiments of the disclosure.

For example, the processor 2301 may transmit a downlink control signal to the UE if necessary according to configuration information established by itself. Thereafter, the transceiver 2302 may transmit related scheduling control information and receive feedback information from the UE.

Meanwhile, embodiments of the disclosure and the accompanying drawings are only examples presented in order to easily describe the disclosure and facilitate comprehension of the disclosure, but are not intended to limit the scope of the disclosure. That is, it is apparent to a person skilled in the art that other modifications based on technical ideas of the disclosure can be implemented. In addition, the above-described embodiments may be used in combination with each other as needed. For example, it may be possible to apply the first embodiment and the second embodiment in combination, or to apply a part of the first embodiment and a part of the second embodiment in combination. In addition, the above embodiments and their modifications may be implemented in the LTE system, the 5G system, and the like.

The invention claimed is:

1. A method of a terminal in a communication system, the method comprising:
   receiving, from a base station, a physical downlink control channel (PDCCH) including downlink control information (DCI) for a physical sidelink shared channel (PSSCH) and associated physical sidelink control channel (PSCCH);
   identifying a value $T_{proc,s}$ associated with a PSSCH preparation time $N_s$; and
   transmitting the PSSCH and associated PSCCH in case that a first symbol of the PSSCH and associated PSCCH is no earlier than a symbol, wherein the symbol is defined based on the $T_{proc,s}$ after a last symbol of the PDCCH including the DCI.

2. The method of claim 1, wherein the PSSCH preparation time $N_s$ is based on a subcarrier spacing, and wherein the subcarrier spacing corresponds to one of a first subcarrier spacing of the PSSCH and associated PSCCH or a second subcarrier spacing of the PDCCH including the DCI.

3. The method of claim 2, wherein the PSSCH preparation time $N_s$ is based on the subcarrier spacing, and wherein the subcarrier spacing corresponds to one of the first subcarrier spacing or the second subcarrier spacing resulting with the largest $T_{proc,s}$.

4. The method of claim 3, wherein the PSSCH preparation time $N_s$ is 10 in case that the subcarrier spacing is 15 kHz, 12 in case that the subcarrier spacing is 30 kHz, 23 in case that the subcarrier spacing is 60 kHz, and 36 in case that the subcarrier spacing is 120 kHz.

5. The method of claim 1, wherein the DCI is ignored in case that the first symbol of the PSSCH and associated PSCCH is earlier than the symbol defined based on the $T_{proc,s}$ after the last symbol of the PDCCH including the DCI.

6. The method of claim 1, wherein the DCI is for scheduling a sidelink resource or for activating a configured grant (CG) sidelink resource.

7. A terminal in a communication system, the terminal comprising:
   a transceiver; and
   a controller configured to:
      receive, from a base station, a physical downlink control channel (PDCCH) including downlink control information (DCI) for a physical sidelink shared channel (PSSCH) and associated physical sidelink control channel (PSCCH),
      identify a value $T_{proc,s}$ associated with a PSSCH preparation time $N_s$, and
      transmit the PSSCH and associated PSCCH, in case that a first symbol of the PSSCH and associated PSCCH is no earlier than a symbol, wherein the symbol is defined based on the $T_{proc,s}$ after a last symbol of the PDCCH including the DCI.

8. The terminal of claim 7, wherein the PSSCH preparation time $N_s$ is based on a subcarrier spacing, and wherein the subcarrier spacing corresponds to one of a first subcarrier spacing of the PSSCH and associated PSCCH, or a second subcarrier spacing of the PDCCH including the DCI.

9. The terminal of claim 8, wherein the PSSCH preparation time $N_s$ is based on the subcarrier spacing, and wherein the subcarrier spacing corresponds to one of the first subcarrier spacing or the second subcarrier spacing resulting with the largest $T_{proc,s}$.

10. The terminal of claim 9, wherein the PSSCH preparation time $N_s$ is 10 in case that the subcarrier spacing is 15 kHz, 12 in case that the subcarrier spacing is 30 kHz, 23 in case that the subcarrier spacing is 60 kHz, and 36 in case that the subcarrier spacing is 120 kHz.

11. The terminal of claim 7, wherein the DCI is ignored in case that the first symbol of the PSSCH and associated PSCCH is earlier than the symbol defined based on the $T_{proc,s}$ after the last symbol of the PDCCH including the DCI.

12. A method of a base station in a communication system, the method comprising:
   generating downlink control information (DCI) for a physical sidelink shared channel (PSSCH) and associated physical sidelink control channel (PSCCH); and
   transmitting, to a terminal, a physical downlink control channel (PDCCH) including the DCI,
   wherein the DCI is generated so that a first symbol of the PSSCH and associated PSCCH is no earlier than a symbol, and wherein the symbol is defined based on a value $T_{proc,s}$ associated with a PSSCH preparation time after a last symbol of the PDCCH including the DCI.

13. A base station in a communication system, the base station comprising:
   a transceiver; and
   a controller configured to:
      generate downlink control information (DCI) for a physical sidelink shared channel (PSSCH) and associated physical sidelink control channel (PSCCH), and
      transmit, to a terminal, a physical downlink control channel (PDCCH) including the DCI,
   wherein the DCI is generated so that a first symbol of the PSSCH and associated PSCCH is no earlier than a symbol, and wherein the symbol is defined based on a value $T_{proc,s}$ associated with a PSSCH preparation time after a last symbol of the PDCCH including the DCI.

* * * * *